US012378949B2

(12) United States Patent
Matharu et al.

(10) Patent No.: US 12,378,949 B2
(45) Date of Patent: Aug. 5, 2025

(54) CANNULA TCP ACTUATOR

(71) Applicant: Toyota Motor Engineering & Manufacturing North America, Inc., Plano, TX (US)

(72) Inventors: Pawandeep Singh Matharu, Dallas, TX (US); Yonas Tadesse, Garland, TX (US); Yuyang Song, Ann Arbor, MI (US); Umesh Gandhi, Farmington Hills, MI (US)

(73) Assignees: TOYOTA MOTOR ENGINEERING & MANUFACTURING NORTH AMERICA, INC., Plano, TX (US); BOARD OF REGENTS; UNIVERSITY OF TEXAS SYSTEM, Austin, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 18/459,059

(22) Filed: Aug. 31, 2023

(65) Prior Publication Data

US 2025/0075685 A1  Mar. 6, 2025

(51) Int. Cl.
*F03G 7/06* (2006.01)
*F03G 7/00* (2006.01)

(52) U.S. Cl.
CPC ........... *F03G 7/0612* (2021.08); *F03G 7/008* (2021.08)

(58) Field of Classification Search
CPC .. F03G 7/0612; F03G 7/06143; F03G 7/0616; F03G 7/062; B25J 9/1075;

(Continued)

(56) References Cited

U.S. PATENT DOCUMENTS 9,784,249 B2   10/2017  Li et al.
9,903,350 B2    2/2018  Li et al.
(Continued)

OTHER PUBLICATIONS

Almubarak et al., KryptoJelly: A Jellyfish Robot with Confined, Adjustable Pre-stress, and Easily Replaceable Shape Memory Alloy NiTi Actuators, Apr. 2020, Smart Materials and Structures 29(7), DOI:10.1088/1361-665X/ab859d, 23 pages total.

(Continued)

*Primary Examiner* — Matthew T Largi
(74) *Attorney, Agent, or Firm* — Jordan IP Law, LLC

(57) ABSTRACT

Technology disclosed herein provides a cannula TCP actuator comprising an annealed microtube assembly including a polymer microtube having inserted therein a resistive heating wire such that the resistive heating wire extends through the length of the polymer microtube, wherein the microtube assembly is arranged in a twisted and coiled tube. The cannula TCP actuator is fabricated by inserting a resistive heating wire into the polymer microtube, forming a microtube assembly by applying a longitudinal force to a first end of the polymer microtube in a direction parallel to a center axis of the polymer microtube and in an opposite direction relative to a second end of the polymer microtube, and applying a rotational force to the second end of the polymer microtube during application of the longitudinal force to cause the polymer microtube to twist and coil about the center axis, and annealing the microtube assembly.

20 Claims, 10 Drawing Sheets

(58) Field of Classification Search
CPC ... B25J 9/142; B25J 18/02; B25J 18/06; B25J 9/1095; D02G 3/26; D02G 3/12; D02G 3/36; D02G 3/38; D02G 3/441; D02J 1/22; D02J 13/00; D04C 1/12
See application file for complete search history.

(56) References Cited

U.S. PATENT DOCUMENTS

| | | | |
|---|---|---|---|
| 10,480,491 | B2 | 11/2019 | Li et al. |
| 11,143,169 | B2 | 10/2021 | Li et al. |
| 11,149,720 | B2 | 10/2021 | Li et al. |
| 11,629,705 | B2 | 4/2023 | Li et al. |
| 2007/0243073 | A1* | 10/2007 | Thomsen, III ........ F03G 7/0612 417/207 |
| 2018/0073491 | A1* | 3/2018 | Gissen .................... F03G 7/065 |
| 2018/0163707 | A1* | 6/2018 | Kaneko ................ F03G 7/0612 |
| 2019/0307919 | A1 | 10/2019 | Lima et al. |
| 2020/0000572 | A1* | 1/2020 | Lima ...................... F03G 7/029 |
| 2020/0088175 | A1 | 3/2020 | Li et al. |
| 2020/0191127 | A1 | 6/2020 | Li et al. |
| 2020/0347525 | A1* | 11/2020 | Kaneko .................. H02N 10/00 |
| 2020/0347835 | A1* | 11/2020 | Kaneko .................... D02G 3/38 |
| 2020/0362836 | A1* | 11/2020 | Guerrero ............... F03G 7/0121 |
| 2020/0399795 | A1* | 12/2020 | Ridley .................... D02G 3/36 |
| 2021/0198817 | A1* | 7/2021 | Göktepe ............. D03D 15/567 |
| 2022/0003221 | A1 | 1/2022 | Li et al. |
| 2024/0084788 | A1* | 3/2024 | Song .................... F03G 7/0612 |

OTHER PUBLICATIONS

Almubarak et al., "Kraken: A wirelessly controlled octopus-like hybrid robot utilizing stepper motors and fishing line artificial muscle for grasping underwater", Jan. 2021,International Journal of Intelligent Robotics and Applications, DOI:10.21203/rs.3.rs-186985/v1, 23 pages total.

Almubarak et al., "Twisted and coiled polymer (TCP) muscles embedded in silicone elastomer for use in soft robot", Apr. 2017, International Journal of Intelligent Robotics and Applications, 1(4) DOI:10.1007/s41315-017-0022-x, 18 pages total.

Cherubini et al., "Experimental characterization of thermally-activated artificial muscles based on coiled nylon fishing lines," Jun. 2015, AIP Advances 5(6), DOI:10.1063/1.4923315, 12 pages total.

Dynalloy, Inc., "FLEXINOL® Actuator Spring Technical and Design Data", website: https://www.dynalloy.com/tech_data_springs.php, obtained Nov. 30, 2023, 1 page.

Haines et al., "New twist on artificial muscles", Sep. 2016, Proceedings of the National Academy of Sciences 113(42) DOI:10.1073/pnas.1605273113, 9 pages total.

Haines et al., "Artificial Muscles from Fishing Line and Sewing Thread", Feb. 2014, Science 343(6173):868-72, DOI:10.1126/science.1246906, 7 pages total.

Hamidi et al., "Poly-saora robotic jellyfish: Swimming underwater by twisted and coiled polymer actuators", Feb. 2020, Smart Materials and Structures 29(4) DOI:10.1088/1361-665X/ab7738, 21 pages total.

Hamidi et al., "Multidirectional 3D-printed functionally graded modular joint actuated by TCPFL muscles for soft robots", Nov. 2019, Bio-Design and Manufacturing 2(7) DOI:10. 1007/s42242-019-00055-6, 14 pages total.

Higueras-Ruiz et al., "Cavatappi artificial muscles from drawing, twisting and coiling polymer tubes", Apr. 2021, Science Robotics 6(53) DOI:10.1126/scirobotics.abd5383, 14 pages total.

Matharu et al., "Jelly-Z: Twisted and Coiled Polymer Muscle Actuated Jellyfish Robot for Environmental Monitoring", Sep. 2022, ACTA IMEKO 11(3):1 DOI:10.21014/acta_imeko.v11i3.1255, 8 pages total.

Mirvakili et al., "Simple and strong: twisted silver painted nylon artificial muscle actuated by Joule heating," Mar. 2014, Proceedings of SPIE—The International Society for Optical Engineering 9056:905601 DOI:10.1117/12.2046411, Conference: SPIE Smart Structures and Materials + Nondestructive Evaluation and Health Monitoring, 11 pages total.

Mu et al., "Sheath-run artificial muscles", Jul. 12, 2019, Science 365, 150-155, 6 pages.

Piao et al., "Enhanced dynamic performance of twisted and coiled soft actuators using graphene coating", Oct. 2019, Composites Part B Engineering 178(42):107499, 8 total pages.

Piao et al., "Graphene/silver nanoflower hybrid coating for improved cycle performance of thermally-operated soft actuators", Oct. 2020, Scientific Reports 10(1) DOI:10.1038/s41598-020-74641-5, 8 pages total.

Wu et al., "Nylon-muscle-actuated robotic finger", Apr. 2015, DOI:10.1117/12.2084902, Conference: SPIE Smart Structures and Materials+ Nondestructive Evaluation and Health Monitoring, 13 pages total.

Wu et al., "A novel soft actuator for the musculoskeletal system", Feb. 2018, Advanced Materials Technologies 3(5):1700359 DOI:10.1002/admt.201700359, 9 pages total.

* cited by examiner

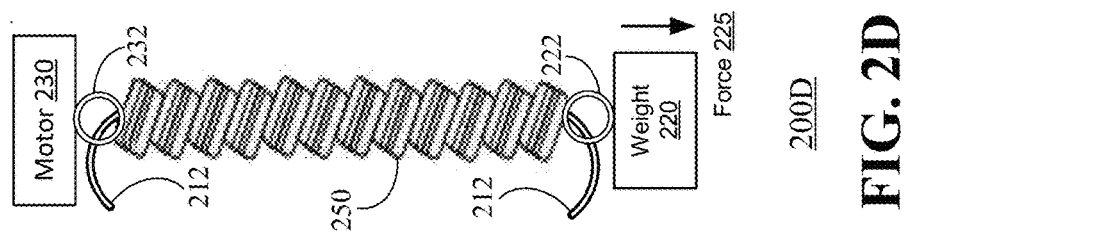
FIG. 2A
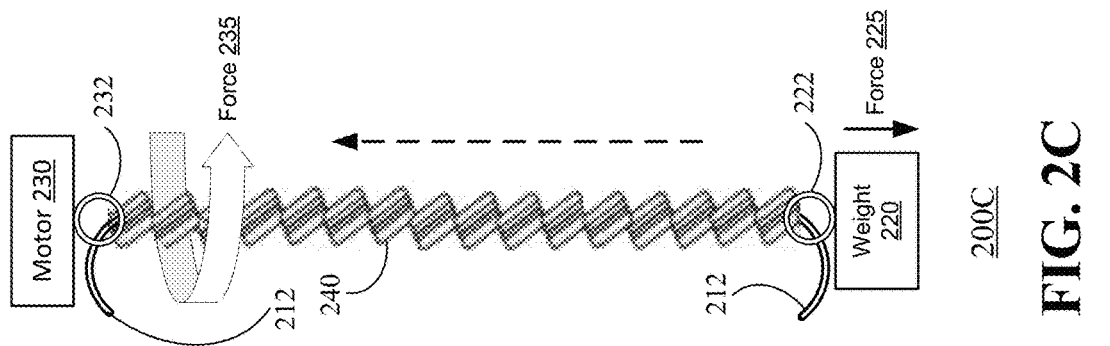
FIG. 2B
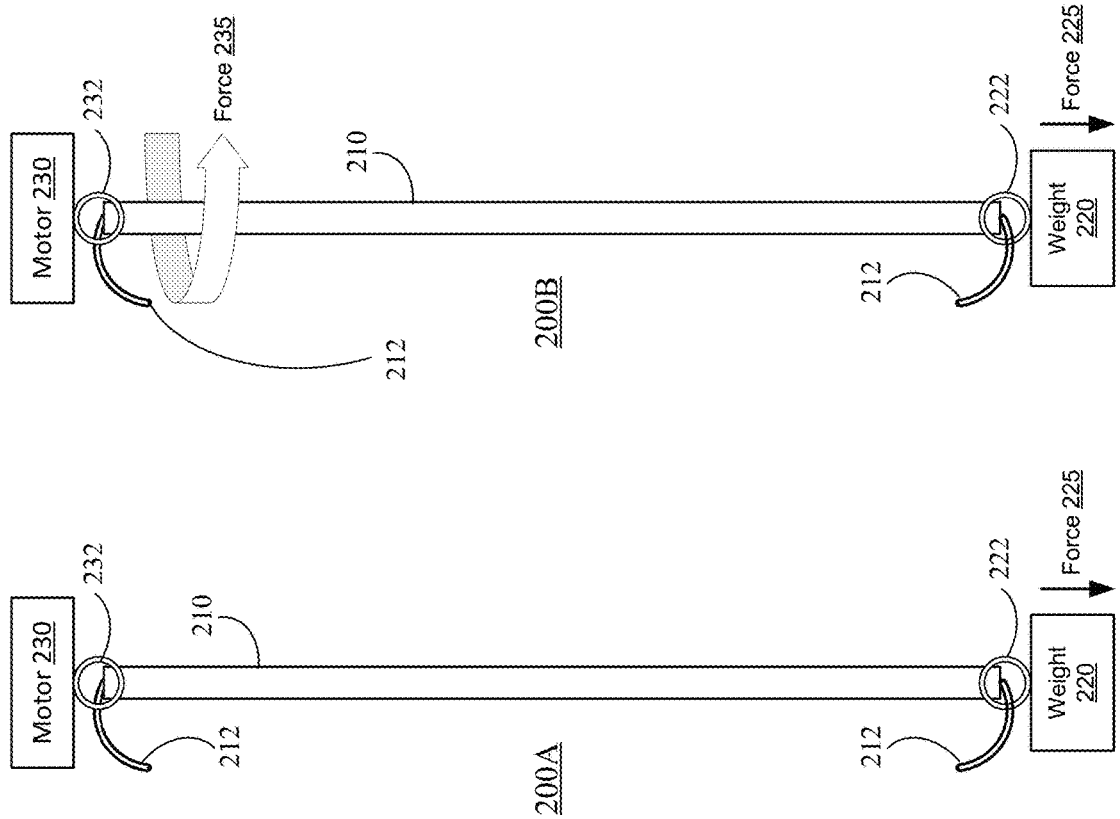
FIG. 2C
FIG. 2D

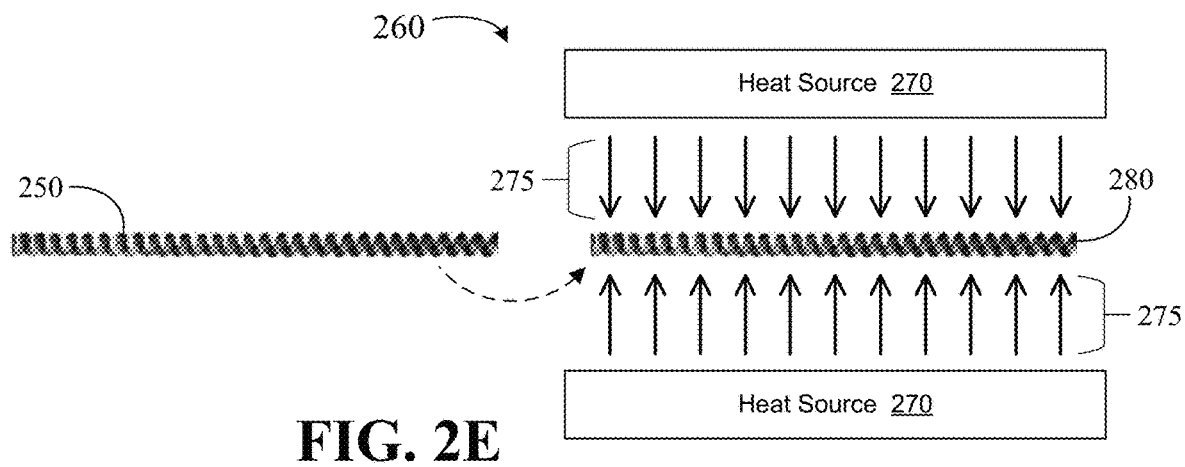
FIG. 2E
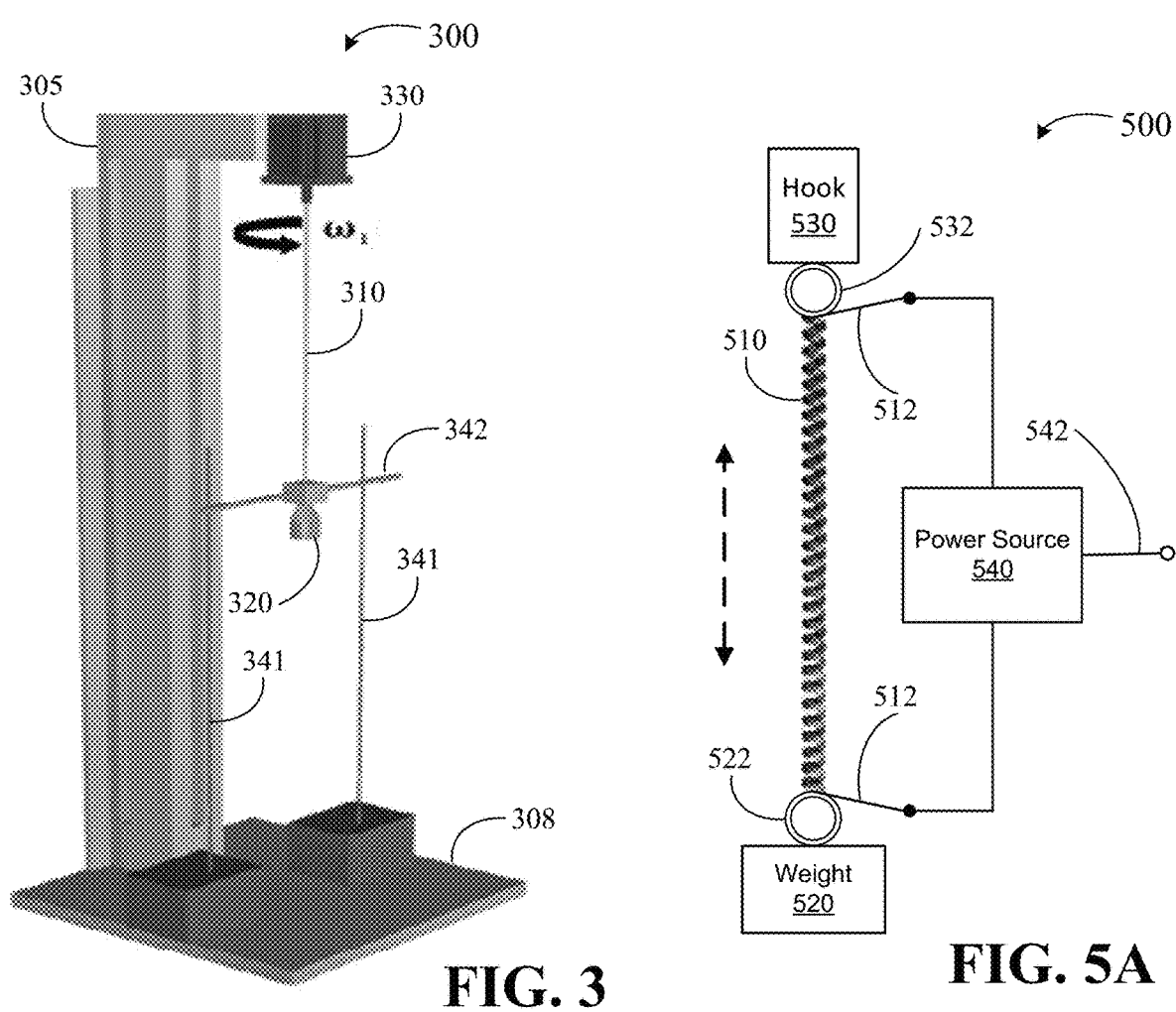
FIG. 3
FIG. 5A
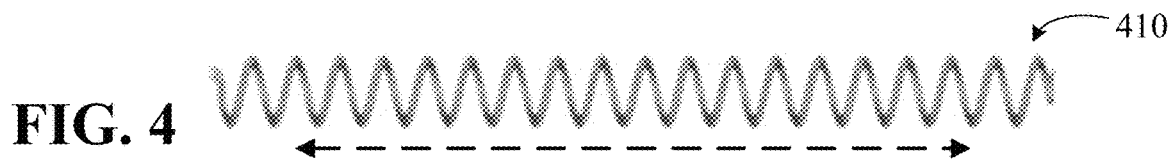
FIG. 4

CANNULA TCP ACTUATOR

TECHNICAL FIELD

Embodiments generally relate to electrothermal actuators. More particularly, embodiments relate to a cannula TCP actuator having a heating wire inserted in a tube prior to twisting and coiling.

BACKGROUND

Electrothermal actuators generate tensile actuation when powered electrically. Prior actuator solutions have several disadvantages. For example, prior electrothermal actuators require relatively higher power but are limited to relatively lower actuation frequency. Some solutions require a special coating on the actuator surface, thus increasing the complexity, time and cost of fabrication. Conventional hydraulic and pneumatic typically require bulky accessories making them impractical for miniaturized or micro-scale actuators.

BRIEF SUMMARY

In some embodiments, a method of fabricating a cannula TCP actuator includes inserting a resistive heating wire into a polymer microtube such that the resistive heating wire extends through the length of the polymer microtube, forming a microtube assembly by applying a longitudinal force to a first end of the polymer microtube, said longitudinal force being applied in a direction parallel to a center axis of the polymer microtube and in an opposite direction relative to a second end of the polymer microtube, and applying a rotational force to the second end of the polymer microtube during application of the longitudinal force and while the resistive heating wire remains inserted in the polymer microtube to cause the polymer microtube to twist and coil about the center axis, and annealing the microtube assembly to form the cannula TCP actuator.

In some embodiments, a cannula TCP actuator includes an annealed microtube assembly comprising a polymer microtube having inserted therein a resistive heating wire such that the resistive heating wire extends through the length of the polymer microtube, wherein the microtube assembly is arranged in a twisted and coiled tube.

In some embodiments, a method of operating a machine including a cannula TCP actuator includes attaching a first end of a cannula TCP actuator to a machine, attaching a second end of the cannula TCP actuator to an object, applying an electrical power to a resistive heating wire in the cannula TCP actuator to cause the cannula TCP actuator to contract and apply a force to the object, wherein the cannula TCP actuator includes an annealed microtube assembly comprising a polymer microtube having inserted therein the resistive heating wire such that the resistive heating wire extends through the length of the polymer microtube, wherein the microtube assembly is arranged in a twisted and coiled tube.

BRIEF DESCRIPTION OF THE SEVERAL VIEWS OF THE DRAWINGS

The various advantages of the embodiments will become apparent to one skilled in the art by reading the following specification and appended claims, and by referencing the following drawings, in which:

FIGS. 2A-2D provide diagrams illustrating an example method of forming a microtube assembly for a cannula TCP actuator according to one or more embodiments;

FIG. 2E illustrates an example annealing process for a cannula TCP actuator according to one or more embodiments;

FIG. 3 provides a diagram illustrating an example apparatus used in forming a microtube assembly for a cannula TCP actuator according to one or more embodiments;

FIG. 4 provides a diagram illustrating an example of an actuation mechanism for a cannula TCP actuator according to one or more embodiments;

FIG. 5A provides a diagram illustrating an example of a setup for training and/or testing of a cannula TCP actuator according to one or more embodiments;

DETAILED DESCRIPTION

An improved twisted and coiled polymer (TCP) actuator as described herein is a cannula TCP actuator that provides an electrothermal actuator that generates tensile actuation when powered electrically. The cannula TCP actuator includes a polymer microtube having a resistive heating wire inserted into the microtube, which is then twisted and coiled in the same step without having to attempt insertion of the heating wire after twisting, or without having to add a separate coiling step after twisting followed by heating wire placement. Actuation occurs under application of electrical power (e.g., observed as a voltage or current). When electrical power is applied across the ends of the resistive heating wire in the cannula TCP actuator, the heating wire heats up the polymer microtube, causing contraction (e.g., shortening) of the cannula TCP actuator. After application of the electrical power and heating of the polymer microtube via the heating wire, removal of the electrical power causes cooling of the polymer microtube, resulting in relaxation (e.g., lengthening under load) of the cannula TCP actuator.

The polymer microtube of the cannula TCP actuator can be made from a material such as, for example, polyethylene or nylon. Once fabricated, the cannula TCP actuator as described herein can serve as an electrothermal actuator to produce micro-level tensile actuation at lower power, which can actuate at higher frequencies in air when compared to previous actuators. The technology disclosed herein provides advantages over previous electrothermal actuators, including lower power consumption (e.g., milliwatt (mW)

range), higher operational frequency (e.g., 0.1 to 1 Hz range), and improved efficiency. For example, previous electrothermal actuators have a heating wire placed on the outside of a fiber or tube. Because the cannula TCP actuator as described herein has the heating wire placed inside the microtube prior to twisting and coiling, the heating wire is in contact with more of a surface of the polymer (i.e., inner surface of the polymer microtube) than prior actuators, thus, enabling the cannula TCP actuator to provide a more-efficient transfer of electrical energy to thermal energy heating of the polymer microtube. Furthermore, fabrication of the cannula TCP actuator as described herein can be completed within as little as 2-3 minutes (excluding time for annealing), depending upon the length of the polymer microtube used and the rotational speed used for twisting and coiling.

Figure 1A:
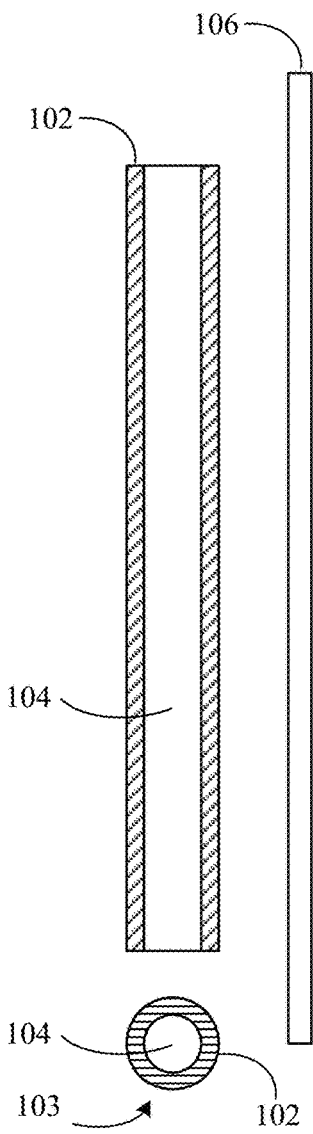
FIGS. 1A-1C provide diagrams illustrating insertion of a resistive heating wire into a microtube used for a cannula TCP actuator according to one or more embodiments.
Figure 1B:
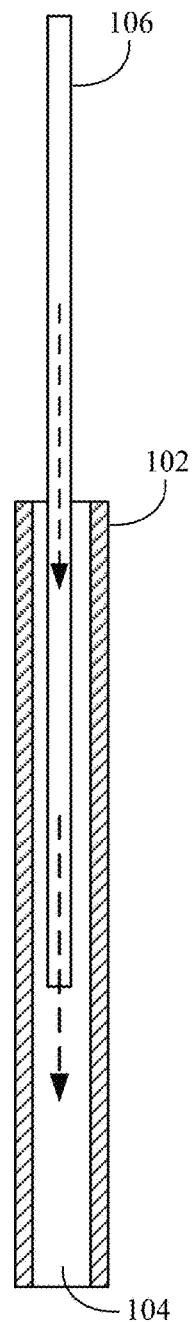
Figure 1C:
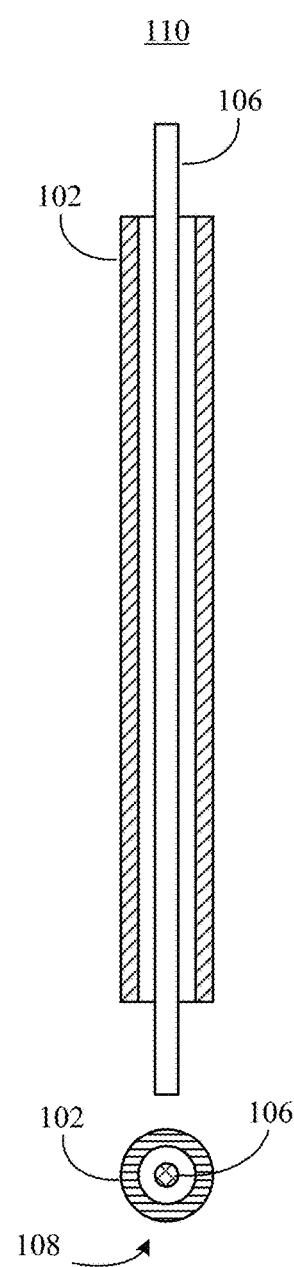

FIGS. 1A-1C provide diagrams illustrating insertion of a resistive heating wire into a polymer microtube used for a cannula TCP actuator according to one or more embodiments, with reference to components and features described herein including but not limited to the figures and associated description. Turning to FIG. 1A, an example of a polymer microtube 102 is shown in a cross-section view, and an end view 103 of the polymer microtube is also shown. The polymer microtube 102 includes an opening 104 (e.g., a channel) running through the entire length of the polymer microtube 102. Also shown is a resistive heating wire 106, which is typically longer than the length of the polymer microtube 102.

Turning now to FIGS. 1B-1C, the diagrams illustrate an example of inserting the resistive heating wire 106 into the polymer microtube 102. As shown in FIG. 1B, the resistive heating wire 106 is placed at one end of the polymer microtube 102 and inserted into the opening 104 (e.g., channel). In the example illustrated in FIG. 1B, the resistive heating wire 106 is pushed into the opening 104 toward the opposite end of the polymer microtube 102. The resistive heating wire 106 is inserted all the way through the opposite end of the polymer microtube 102 such that the ends of the resistive heating wire 106 extend beyond each end of the polymer microtube 102, as shown in FIG. 1C, to provide a polymer microtube unit 110. Also shown in FIG. 1C is an end view 108 of the polymer microtube 102 with the resistive heating wire 106 inserted in the opening of the polymer microtube 102.

In some embodiments, the resistive heating wire 106 is secured in place after being inserted into the polymer microtube 102. For example, the resistive heating wire 106 can be secured by tying or crimping the ends of the polymer microtube 102 with the ends of the resistive heating wire 106. Other means can be used for securing the resistive heating wire 106 in place. In some examples, a device (such as, e.g., a washer, pin, etc.—not shown in FIG. 1C) can also be attached (e.g., as part of the tying or crimping of the ends of the polymer microtube 102) to each end of the polymer microtube 102, to be used to connect each end of the polymer microtube 102 to another device or apparatus (such as, e.g., described herein with reference to FIGS. 2A-2D).

The polymer microtube 102 is made of a flexible polymer material (e.g. a non-conductor) that can be twisted and coiled (e.g., as described herein with reference to FIGS. 2A-2D and 3). As one example, in some embodiments the polymer microtube 102 is made of polyethylene. As another example, in some embodiments the polymer microtube 102 is made of nylon. The resistive heating wire 106 is made of a material that heats when an electrical power is applied—thus heating the polymer microtube (which provides for electrothermal actuation of the cannula TCP actuator once fabricated). As one example, in embodiments the resistive heating wire 106 is made of nichrome wire. When used as the heating wire, nichrome has the benefit of the conformal nature of the resistance wire which helps it to provide a conductive layer without affecting the actuation cycle of the finished actuator.

The polymer microtube 102 and the resistive heating wire 106 can be of various sizing, depending on the particular design and intended application for the cannula TCP actuator. The sizing of the polymer microtube 102 and the resistive heating wire 106 are selected relative to each other. For example, the diameter of the resistive heating wire 106 must be less than the diameter of the opening 104 of the polymer microtube 102 to enable insertion of the resistive heating wire 106 into the full length of the polymer microtube 102. As one example, in an embodiment the polymer microtube 102 has an inner diameter of 280 micrometers (μm), corresponding to the channel 104, and an outer diameter of 600 μm, and the resistive heating wire 106 has a diameter of 80 μm. Other sizes of the polymer microtube 102 and/or the resistive heating wire 106 can be used, depending on the application and/or the desired characteristics of the cannula TCP actuator. For example, a polymer microtube 102 having an inner diameter less than of 280 μm (such as, e.g., 140 μm) can be used with resistive heating wire 106 having a diameter of 80 μm.

The length of the resistive heating wire 106 is also selected relative to the length of the polymer microtube 102. For example, the length of the resistive heating wire 106 is selected such that the amount of the resistive heating wire 106 extending beyond each end of the polymer microtube 102 is a sufficient to enable an electrical connection (e.g., to a power source). As one example, in an embodiment where the polymer microtube 102 has an inner diameter of 280 μm, corresponding to the channel 104, and an outer diameter of 600 μm, and the resistive heating wire 106 has a diameter of 80 μm, the polymer microtube 102 has a length of 100 millimeters (mm), and the resistive heating wire 106 has a length of 150 mm, such that approximately 25 mm of the resistive heating wire 106 extends beyond the polymer microtube 102 when the resistive heating wire 106 is inserted in the polymer microtube 102. Other lengths of the polymer microtube 102 and the resistive heating wire can be used, depending on the application and/or the desired characteristics of the cannula TCP actuator. In embodiments a terminal (e.g., connector) is placed at each of the ends of the resistive heating wire 106 to provide a convenient electrical connection to connect an electrical power source to the resistive heating wire. Terminal placement can occur at any point during fabrication of the cannula TCP actuator, typically after the resistive heating wire 106 has been inserted into the polymer microtube 102.

FIGS. 2A-2D provide diagrams illustrating an example method 200 (including process components 200A, 200B, 200C and 200D) of forming a microtube assembly for a cannula TCP actuator according to one or more embodiments, with reference to components and features described herein including but not limited to the figures and associated description. The method 200 is performed on a polymer microtube unit 210, which corresponds to the polymer microtube unit 110 as described herein with reference to FIGS. 1A-1C. The polymer microtube unit 210 includes a resistive heating wire (e.g., the resistive heating wire 106) that has been fully inserted into a polymer microtube (e.g., the polymer microtube 102). As illustrated in FIGS. 2A-2D, the polymer microtube unit 210 has resistive heating wire ends 212 extending from each end of the polymer microtube, the resistive heating wire ends 212 being part of the resistive heating wire (e.g., the resistive heating wire 106) that is inserted into the polymer microtube (e.g., the polymer microtube 102). As described herein with reference to FIGS. 2A-2D and 3, the application of a force, or attachment of a device or an object, to either end of the polymer microtube unit (e.g., the polymer microtube unit 210) means application of the force, or attachment of the device or the object, to the respective end of the polymer microtube (e.g., the polymer microtube 102).

Turning to FIG. 2A, according to the process component 200A a longitudinal force 225 is applied to a first end of the polymer microtube unit 210. The longitudinal force 225 is applied in a direction parallel to a center (i.e., lengthwise) axis of the microtube and in an opposite direction relative to second end of the polymer microtube. In some embodiments, the longitudinal force 225 is applied by attaching a weight 220 to the first end of the polymer microtube unit 210 (i.e., the first end of the polymer microtube 102) via an attachment device 222, and attaching a second end of the polymer microtube unit 210 (i.e., the second end of the polymer microtube 102) to a motor 230 via an attachment device 232.

In some embodiments, the attachment device 222 and the attachment device 232 also help secure the resistive heating wire 106 within the polymer microtube 102. In some embodiments, the attachment device 222 and the attachment device 232 are each a washer (e.g., attached to ends of the polymer microtube 102 as described herein with reference to FIG. 1C). Other means of applying the longitudinal force 225 force can be used. In embodiments, the attachment device 222 and/or the attachment device 232 are permanently attached to the respective ends of the polymer microtube 102, thus becoming part of the cannula TCP actuator as fabricated (e.g., they are integrated in the cannula TCP actuator).

The weight 220 is attachable to the first end of the polymer microtube unit 210 via the attachment device 222, and is a suitable weight for applying the longitudinal force 225. In the example configuration illustrated in FIG. 2A, the longitudinal force 225 is applied in a downward direction due to attachment of the weight 220. The weight is selected based on the material and geometry of the polymer microtube 102. For example, in an embodiment where the polymer microtube 102 is made of polyethylene and has an inner diameter of 280 μm and an outer diameter of 600 μm, a weight of 50 grams (g) (or approximately 50 g) is used; for this particular example, a weight significantly greater than 50 g can risk breakage of the polymer microtube 102, and a weight significantly less than 50 g can result in a less than optimal coiling (or even insufficient coiling) of the polymer microtube unit 210.

In embodiments a terminal (i.e., connector) is placed at each of the ends 212 of the resistive heating wire to provide a convenient electrical connection to connect an electrical power source to the resistive heating wire. Terminal placement can occur at any point during fabrication of the cannula TCP actuator, preferably (depending on the type and configuration of the connector) after the resistive heating wire has been inserted into the polymer microtube.

Turning now to FIG. 2B, during application of the longitudinal force 225, a rotational force 235 is applied to the second end of the polymer microtube unit 210, while the first end of the polymer microtube unit 210 is held (i.e., kept) from rotating (i.e., in a plane perpendicular to the longitudinal axis), such that the first end of the polymer microtube unit 210 does not rotate. Because the first end of the polymer microtube unit 210 is kept from rotating, when the rotational force 235 is applied to the second end of the polymer microtube unit 210, the polymer microtube unit 210 will begin to twist and then coil, as described further below. In some embodiments, the rotational force 235 is applied by attaching the second end of the polymer microtube unit 210 (i.e., the second end of the polymer microtube 102) to the motor 230 via the attachment device 232, and then turning the motor 230 on. The motor 230 provides rotation at a given frequency when operated. In some embodiments a stopper (not shown in FIGS. 2A-2D) is used to prevent the weight (and, thus, the first end of the polymer microtube 102) from rotating. In some other embodiments a stopper is applied to the polymer microtube 102 at the first end (or at a place proximate to the first end) to prevent the first end from rotating. Thus, by preventing the first end from rotating, the stopper aids in the process of twisting and subsequently coiling the polymer microtube 102.

The motor 230 is attachable via the attachment device 232 and is a suitable motor for applying the rotational force 235. In some embodiments, and as shown in the example configuration illustrated in FIG. 2B, the rotational force 235 is applied to the polymer microtube unit 210 in a counter-clockwise direction (e.g., from the perspective of the motor 230 or other device that is applying the rotational force 235). For example, in embodiments the motor 230 is operated at 150 revolutions per minute (RPM); other rotational speeds can be used, depending on the characteristics of the cannula TCP actuator and/or application; the rotational speed can impact the fabrication time. The motor can be operated for a fixed time, depending on the RPM and the length of the polymer microtube unit 210. Other means of applying the rotational force 235 force can be used.

The effect of the rotational force 235 combined with the longitudinal force 225, while the first end of the polymer microtube unit 210 is kept from rotating, is to cause the polymer microtube unit 210 to twist and coil about its center axis (e.g., the center axis of the polymer microtube 102) as illustrated and further described with reference to FIGS. 2C-2D. Turning now to FIG. 2C, as the rotational force 235 combined with the longitudinal force 225 are applied, the polymer microtube unit 210 begins to twist and coil about its center axis (e.g., the center axis of the polymer microtube 102) which causes the length of the polymer microtube unit 210 to shorten, forming a partially twisted and coiled microtube 240. The twisting action can begin within seconds after the rotational force 235 begins. In the example configuration illustrated in FIG. 2C, as the length of the polymer microtube unit 210 shortens, the end of the polymer microtube unit 210 with the attached weight 220 raises upward toward the motor 230.

Turning now to FIG. 2D, once the polymer microtube unit 210 reaches the appropriate amount of coiling, the twisting and coiling process is stopped, resulting in a microtube assembly 250. In some embodiments, an appropriate amount of twisting and coiling is obtained when the microtube assembly 250 is approximately one-half of the length of the length of the polymer microtube unit 210 before the rotational force 235 was first applied to begin the twisting and coiling. The appropriate amount of twisting and coiling can depend on the materials and configuration of the polymer microtube unit 210, and can be determined through observation and then repeated for similar polymer microtube unit configurations.

The twisting and coiling process is typically stopped by first removing the rotational force 235 (e.g., if the motor 230 was used to apply the rotational force 235, the motor 230 is turned off). At this point, the longitudinal force 225 can be removed from the (e.g., if the weight 220 was used to apply the longitudinal force 225, the weight 220 is removed), and then the microtube assembly 250 is removed from any device that supplied the rotational force 235 (e.g., removed from the motor 230); this latter step can be performed before removal of the weight 220 (if used). As a practical matter, in embodiments using a motor and weight, it is easier to stop the motor before removing the weight. The resulting microtube assembly 250 is ready for the next stage, thermal annealing. In some embodiments, the resulting microtube assembly 250 has a length approximately one-half of the length of the polymer microtube 102 before the twisting and coiling. As an example, if the polymer microtube 102 is 100 mm long before the twisting and coiling (e.g., at the stage shown in FIG. 2A), then in some embodiments the resulting microtube assembly 250 will have a length of approximately 50 mm.

Once the microtube assembly 250 is formed and the rotational force 235 along with the longitudinal force 225 have been removed (e.g., as described herein with reference to FIGS. 2A-2D), the microtube assembly 250 is passed to a thermal annealing stage. The annealing stage provides for annealing the microtube assembly 250 using heat applied externally to the microtube assembly 250 such that the resulting cannula TCP actuator retains the twisted and coiled shape. Otherwise, without annealing it is possible for the microtube assembly 250 to eventually lose at least some portion of the twisted and coiled shape, or the microtube assembly 250 might untwist and cannot be further annealed.

Turning to FIG. 2E, illustrated is an example annealing process 260 for a cannula TCP actuator according to one or more embodiments, with reference to components and features described herein including but not limited to the figures and associated description. As illustrated in FIG. 2E, the microtube assembly 250 is placed in proximity to a heat source 270. For example, the microtube assembly 250 can be placed horizontally on a supporting surface underneath or otherwise near to the heat source 270. Heat 275 from the heat source 270 is applied to the microtube assembly 250 over a period of time, which anneals the microtube assembly 250 (in particular, the heat 275 anneals the twisted and coiled polymer microtube that is part of the microtube assembly 250). In embodiments the heat source 270 will apply heat from multiple directions or omnidirectionally around the microtube assembly 250 (e.g., via an enclosed unit such as, e.g., an oven or a furnace, etc.). In some embodiments the heat source 270 will apply heat from a single direction or limited directions.

In completing the annealing process, the amount of time for exposing the microtube assembly 250 to the heat 275 and/or the temperature of the heat 275 can vary, depending on the materials used for the components of the microtube assembly 250 and/or the configuration (e.g., sizing, thickness of the microtube, etc.) of the components of the microtube assembly 250. As one example, in an embodiment where the microtube assembly 250 has a polymer microtube 102 with an inner diameter of 280 µm and an outer diameter of 600 m, a resistive heating wire 106 with a diameter of 80 µm, the annealing time can be 45 minutes at a temperature of 110 degrees Celsius. As another example, in a similar embodiment the annealing time can be 60 minutes at a temperature of 90 degrees Celsius. As another example, in an embodiment where the polymer microtube material is a low density polyethylene, the annealing time can be set to a time where the polymer microtube material begins to show an off-white tinge.

Once the annealing process 260 is done, the result is a fabricated cannula TCP actuator 280. As one example, in an embodiment where the microtube assembly 250 is formed from a polymer microtube 102 of length 100 mm with an inner diameter of 280 µm and an outer diameter of 600 µm, and a resistive heating wire 106 of length 150 mm with a diameter of 80 µm, the resulting fabricated cannula TCP actuator has a length of approximately 50 mm (e.g., approximately one-half of the length of the polymer microtube component used in starting the fabrication process).

The heat source 270 can be a variety of devices, and/or can be integrated within an enclosed or a partially enclosed unit such as, e.g., an oven or a furnace, etc. In embodiments the heat source 270 is preheated to the desired annealing temperature before starting the annealing process. In embodiments, to help keep the shape and pitch of the microtube assembly 250 intact during annealing, both ends are fixed to clamps on a metal plate and the whole frame is placed proximate to the heat source 270. In embodiments, depending on the nature or configuration of the heat source 270, the heat 275 may be provided on one side of the microtube assembly 250 or on two sides of the microtube assembly 250. In embodiments, the microtube assembly 250 is turned over approximately half way through the annealing process, such that each side of the microtube assembly 250 receives approximately the same amount of heat (e.g., to provide approximately uniform heating of the microtube assembly 250).

FIG. 3 provides a diagram illustrating an example apparatus 300 used in forming a microtube assembly for a cannula TCP actuator according to one or more embodiments, with reference to components and features described herein including but not limited to the figures and associated description. In embodiments, the apparatus 300 is used to form a microtube assembly according to the method 200 (FIGS. 2A-2D, already discussed). As illustrated in FIG. 3, the apparatus 300 includes a tower 305 and a base 308. The tower 305 has an attached motor 330 to provide a rotational force (e.g., the rotational force 235 in FIGS. 2A-2D, already discussed). A polymer microtube unit 310 is attached at one end to the motor 330, and a weight 320 is attached at the other end of the polymer microtube unit 310 to supply a longitudinal force (e.g., the longitudinal force 225 in FIGS. 2A-2D, already discussed).

The polymer microtube unit 310 includes a polymer microtube (such as, e.g., the polymer microtube 102 in FIGS. 1A-1C, already discussed) having a fully-inserted resistive heating wire (e.g., the resistive heating wire 106 as illustrated in FIGS. 1A-1C, already discussed). In embodiments, the polymer microtube unit 310 corresponds to the polymer microtube unit 110 (FIG. 1C) and/or the polymer microtube unit 210 (FIGS. 2A-2D), the weight 320 corresponds to the weight 220 (FIGS. 2A-2D), and the motor 330 corresponds to the motor 230 (FIGS. 2A-2D).

As illustrated in FIG. 3, the apparatus 300 also includes two vertically-arranged posts 341 and a horizontal bar 342 that, in some embodiments, can serve as an example of a stopper. The posts 341 are each anchored in the base 308. The horizontal bar 342 is attached to the weight 320, and is positioned to engage the posts 341 such that, when the rotational force is applied via the motor 330, the horizontal bar 342 and the weight 320—and thus the end of the polymer microtube unit 310 to which the weight 320 is attached—are effectively kept from rotating when the rotational force is applied via the motor 330.

Once the polymer microtube unit 310 is placed in the apparatus 300 and shown in FIG. 3 and described herein, the apparatus 300 operates by turning the motor 330 on, which applies a rotational force to cause twisting and coiling of the polymer microtube unit 310 about its center axis (e.g., the center axis of the polymer microtube 102), which causes the length of the polymer microtube unit 310 to shorten, as described herein with reference to FIGS. 2B-2C. The motor 330 operates at a rotational frequency of $\omega_1$. In embodiments the motor 330 is operated at 150 RPM; other rotational speeds can be used, depending on the characteristics of the cannula TCP actuator and/or application. The rotational speed can impact the fabrication time. The motor 330 is operated until the twist and coil operation is completed (e.g., as described herein with reference to FIGS. 2A-2D). The posts 341 are of a length sufficient to keep the horizontal bar 342, the weight 320 and the lower end of the polymer microtube unit 310 from rotating while the polymer microtube unit 310 is being twisted and coiled by the rotational force applied via the motor 330 and, hence, while the lower end of the polymer microtube unit 310 and the weight are pulled upward by the twisting and coiling process.

FIG. 4 provides a diagram illustrating an example of an actuation mechanism for a cannula TCP actuator 410 according to one or more embodiments, with reference to components and features described herein including but not limited to the figures and associated description. In embodiments the cannula TCP actuator 410 corresponds to the cannula TCP actuator 280 (FIG. 2E, already discussed). The cannula TCP actuator 410 as described herein provides an electrothermal actuation mechanism that is triggered by application of, or removal of, an electrical power across the resistive heating wire. Application of an electrical power causes the resistive heating wire in the cannula TCP actuator 410 to heat up which, in turn, causes the coiled polymer microtube to contract (e.g., shorten in length), resulting in strain or displacement by the cannula TCP actuator 410 along the center (lengthwise) axis. Increasing the electrical power applied also increases the strain or displacement of the cannula TCP actuator 410. In some embodiments the cannula TCP actuator 410 can also exhibit a minor rotational actuation. After an electrical power has been applied, removal of that electrical power causes the resistive heating wire in the cannula TCP actuator 410 to cool which, in turn, causes the cannula TCP actuator 410 to relax (e.g., lengthen under load).

After the annealing process has been completed for the cannula TCP actuator (e.g., the cannula TCP actuator 280 of FIG. 2E and/or the cannula TCP actuator 410 of FIG. 4), in embodiments a training process is applied to the fabricated cannula TCP actuator. Training of the cannula TCP actuator is used to provide for more reliable and repeatable performance (e.g., improved consistency in performance) of the cannula TCP actuator. Training of the cannula TCP actuator includes, in embodiments, placing a load on the cannula TCP actuator and alternating application then withdrawal of electrical power to/from the resistive heating wire of the cannula TCP actuator. In some in some embodiments, the process of application then withdrawal of the electrical power is repeated for several cycles (such as, e.g., 3 cycles or 5 cycles).

In some embodiments, a multi-phase training process is applied (such as, e.g., 3 phases), where each phase includes the application then withdrawal of the electrical power that is repeated for several cycles, and the amount of power is varied from phase-to-phase. In some embodiments, the time for application and withdrawal of the electrical power varies. In some embodiments, the level of electrical power applied for training a cannula TCP actuator is less than or equal to the level of electrical power applied for operational use of the trained cannula TCP actuator (e.g., in a machine).

An example of a setup that can be used for training a cannula TCP actuator is provided herein with reference to FIG. 5A. An example method of training a cannula TCP actuator is provided herein with reference to FIG. 7B. As one training example, in an embodiment where the cannula TCP actuator is of a length of 50 mm and has a polymer microtube 102 with an inner diameter of 280 μm and an outer diameter of 600 μm, a resistive heating wire 106 with a diameter of 80 μm, example parameters used for training the cannula TCP actuator (using the setup as described herein with reference to FIG. 5A) are provided in Table 1 below.

TABLE 1

| Phase | Current (mA) | Voltage (V) | Heating Time (s) | Cooling Time (s) | Cycles |
|---|---|---|---|---|---|
| 1 | 4 mA | ~0.9 | 2 s | 20 s | 5 |
| 2 | 5 mA | ~0.9 | 2 s | 20 s | 5 |
| 3 | 6 mA | ~0.9 | 2 s | 20 s | 5 |

With reference to Table 1, it will be understood that the application of an electrical power (e.g., observed as a voltage or current) across the resistive heating wire results in drawing a current of a corresponding amperage, depending on the resistive value (e.g., in ohms) of the given resistive heating wire, such that a voltage or current can be indicated. The heating time refers to the period for application of the electrical voltage to the resistive heating wire, and the cooling time refers to the period for withdrawal of the electrical power from the resistive heating wire.

After training, in embodiments a testing process is applied to the cannula TCP actuator in order to characterize the performance of the cannula TCP actuator under different conditions (such as, e.g., varying activation frequencies or varying loads). In embodiments, where a number of cannula TCP actuators having the same components and materials has been fabricated (e.g., a volume production), samples of the cannula TCP actuators can be selected for characterization, rather than passing all of the cannula TCP actuators through the testing process for characterization.

The testing process for characterization includes application of an electrical power across the resistive heating wire of the cannula TCP actuator to cause activation of the cannula TCP actuator, measuring a performance characteristic, then varying a parameter such as, for example, input power (e.g., varying a voltage or current), frequency, or load, and measuring the performance characteristic under the revised parameters; this can be repeated for several parameter changes. Measured performance characteristics can include, e.g., mechanical performance characteristics such as displacement (mm) of the cannula TCP actuator or strain (percentage of unloaded length) of the cannula TCP actuator. An example of a setup that can be used for testing a cannula TCP actuator for characterization is provided herein with reference to FIG. 5A. Examples of characterization results for a cannula TCP actuator are provided herein with reference to FIGS. 5B-5K. An example method of testing a cannula TCP actuator for characterization is provided herein with reference to FIG. 7C.

FIG. 5A provides a diagram illustrating an example of a setup 500 for training and/or testing (for characterization) of a fabricated cannula TCP actuator according to one or more embodiments with reference to components and features described herein including but not limited to the figures and associated description. The setup 500 includes a weight 520, a hook 530, and a switchable power source 540. One end of a cannula TCP actuator 510 is attached to the hook 530 via an attachment device 532, and the weight 520 is attached to the other end of the cannula TCP actuator 510 via an attachment device 522 to place a load on the cannula TCP actuator 510.

The power source 540 provides an electrical power (e.g., observed as a voltage or current) that is switchable via a switch input 542 (e.g., a switch or a logic input signal that turns power on or off). The power source 540 is electrically coupled to each end 512 of the resistive heating wire in the cannula TCP actuator 510, such that the electrical power can be switchably applied to and withdrawn from the cannula TCP actuator 510. For example, the power source 540 can be connected to electrical connectors attached to the resistive heating wire in the cannula TCP actuator 510. When the power source 540 is switched on (e.g., via a logic signal), the electrical power is applied to the cannula TCP actuator 510, causing heating and thus actuation (e.g., contraction) of the cannula TCP actuator 510. When the power source 540 is switched off (e.g., via a logic signal), the electrical power is withdrawn from the cannula TCP actuator 510, causing cooling and thus relaxation (e.g., lengthening under load) of the cannula TCP actuator 510.

In embodiments, the cannula TCP actuator 510 corresponds to the cannula TCP actuator 280 fabricated as described herein with reference to FIGS. 1A-1C and 2A-2E. In embodiments, the attachment device 522 corresponds to the attachment device 222 (FIGS. 2A-2D), and the attachment device 532 corresponds to the attachment device 232 (FIGS. 2A-2D). In embodiments, the attachment device 522 and/or the attachment device 532 are integrated into the cannula TCP actuator 510.

FIGS. 5B-5K provide diagrams illustrating examples of performance characterization graphs for an example cannula TCP actuator according to one or more embodiments, with reference to components and features described herein including but not limited to the figures and associated description. The performance characterization graphs of FIGS. 5B-5K provide examples of performance characteristics for an example cannula TCP actuator tested using a setup similar to the setup 500 (e.g., as described herein with reference to FIG. 5A). The graphs were generated based on selectively applying electrical power to and withdrawing electrical power from a fabricated TCP actuator, providing a heating time (power source on) and followed by a cooling time (power source off), respectively. An example cannula TCP actuator having a length of 50 mm and includes a polymer microtube with an inner diameter of 280 μm and an outer diameter of 600 μm, and a nichrome resistive heating wire with a diameter of 80 μm, was used for obtaining the example performance characterization graphs of FIGS. 5B-5K.

Figure 5B:
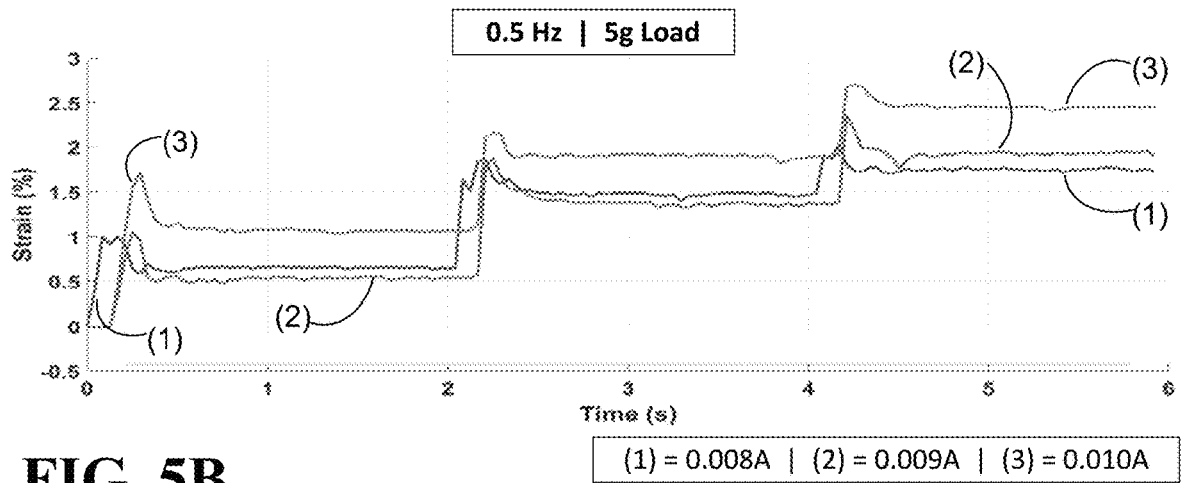
FIGS. 5B-5K provide diagrams illustrating examples of performance characterization graphs for an example cannula TCP actuator according to one or more embodiments.
Figure 5C:
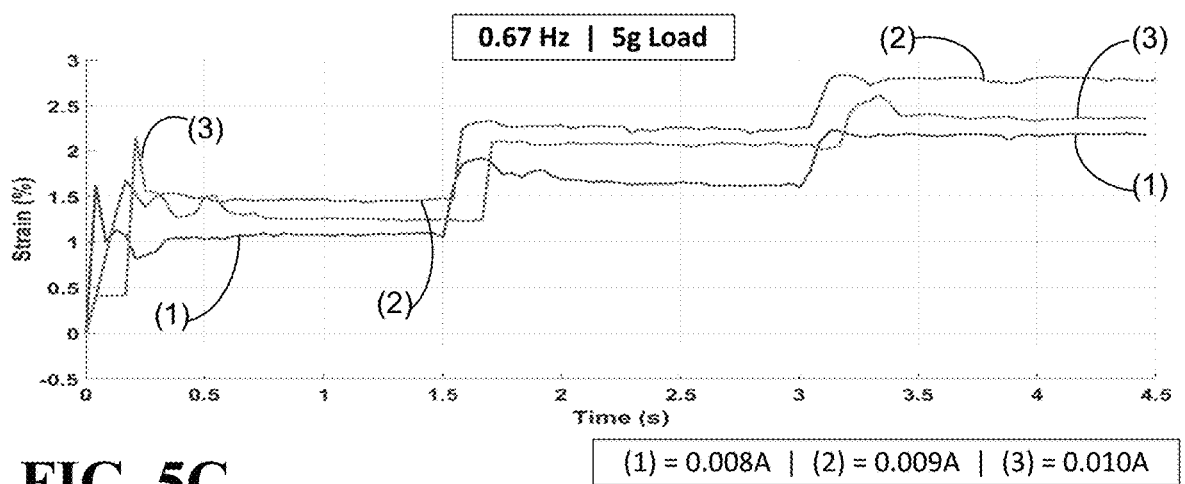
Figure 5D:
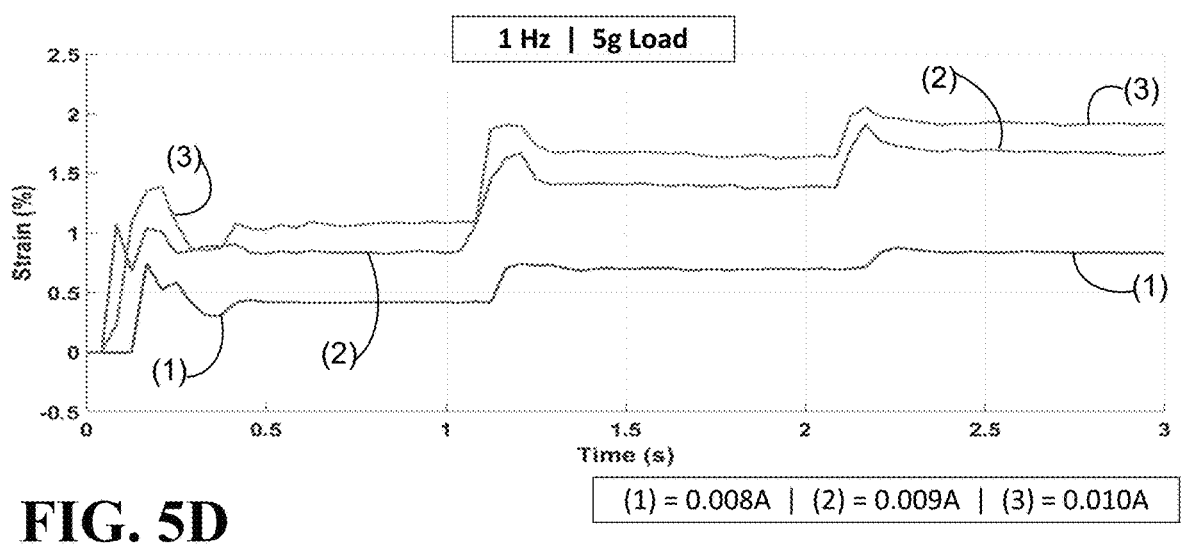
Figure 5E:
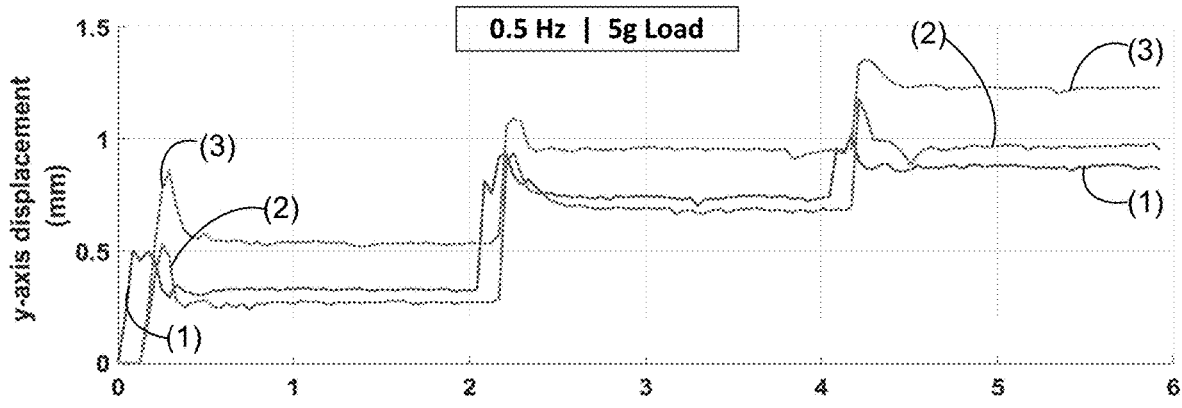
Figure 5F:
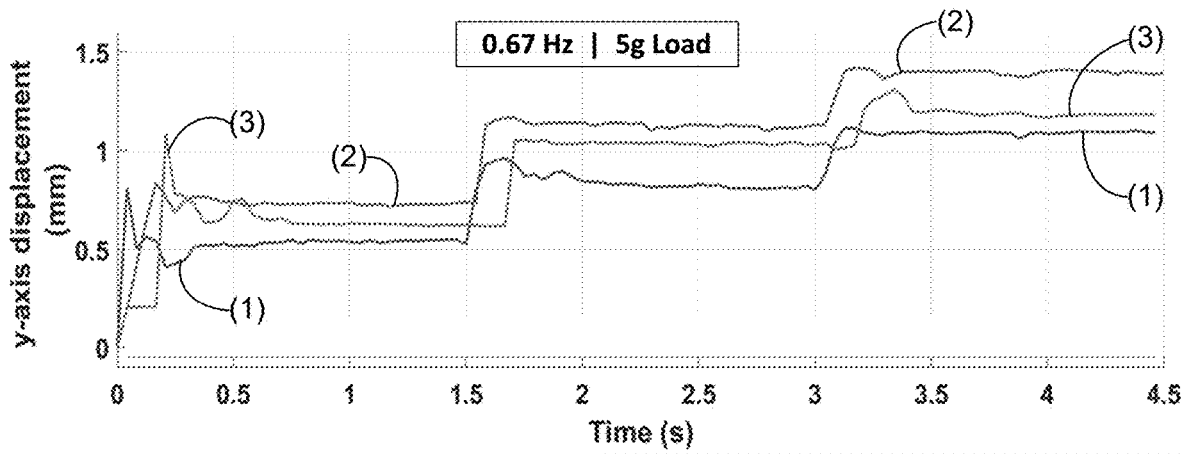
Figure 5G:
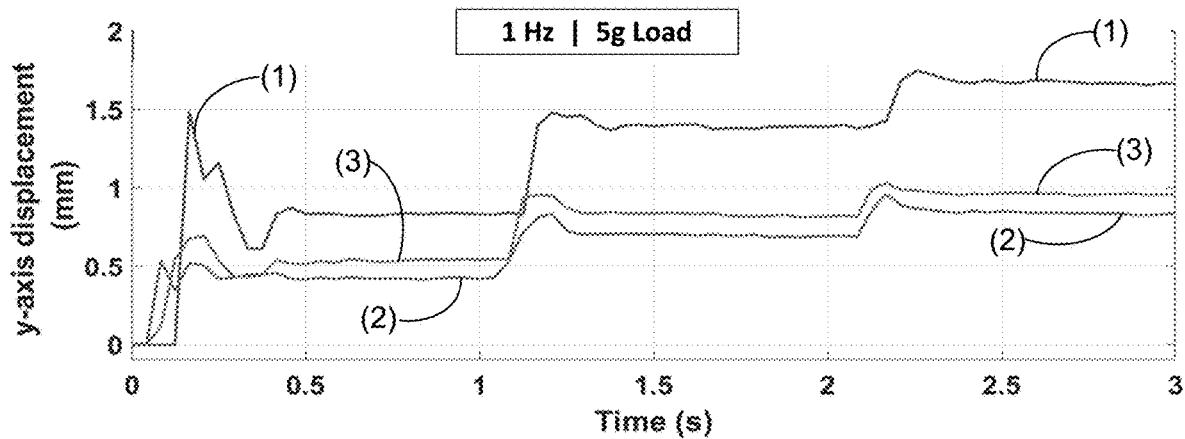

Turning now to FIGS. 5B-5G, these figures provide graphs showing performance at varying actuation frequencies. FIGS. 5B, 5C and 5D provide graphs showing strain (% of the unloaded length) vs. time exhibited by the cannula TCP actuator with a 5 g load and at actuation frequencies of 0.5 Hz (0.5 s heating, 1.5 s cooling), 0.67 Hz (0.5 s heating, 1.0 s cooling) and 1 Hz (0.5 s heating, 0.5 s cooling), respectively. Likewise, FIGS. 5E, 5F and 5G provide graphs showing displacement (in mm) along the y-axis (e.g., vertically) vs. time exhibited by the cannula TCP actuator with a 5 g load and at actuation frequencies of 0.5 Hz (0.5 s heating, 1.5 s cooling), 0.67 Hz (0.5 s heating, 1.0 s cooling) and 1 Hz (0.5 s heating, 0.5 s cooling), respectively. Each graph includes three sets of curves for varying input electrical power, (1) current of 8 mA (0.9 V, 7.2 mW), (2) current of 9 mA (0.9 V, 8.1 mW), and (3) current of 10 mA (0.9 V, 9.0 mW).

Figure 5H:
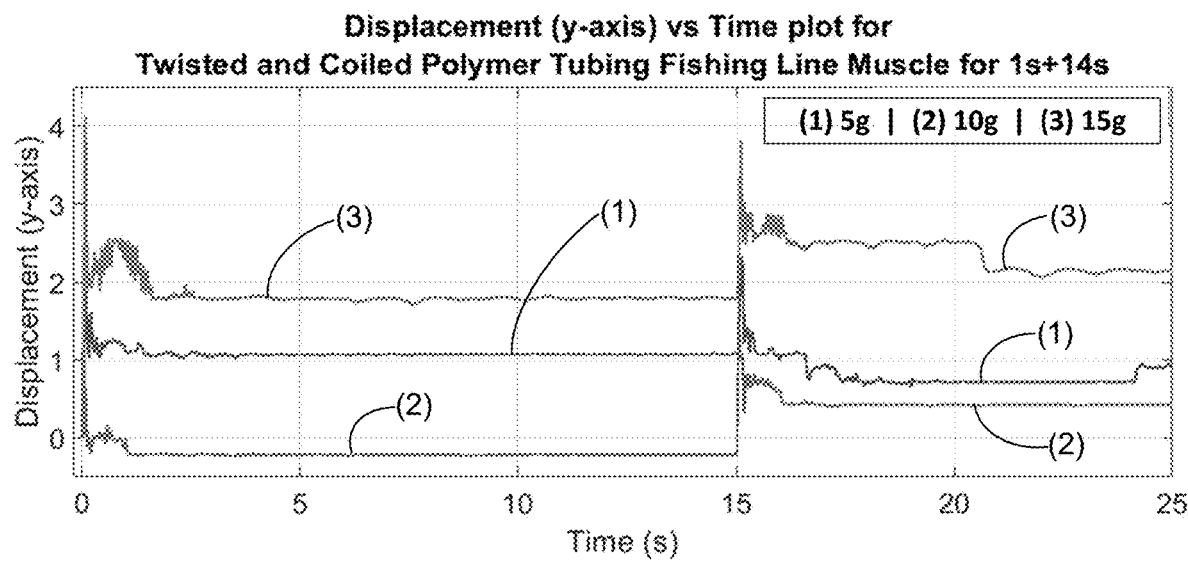
Figure 5I:
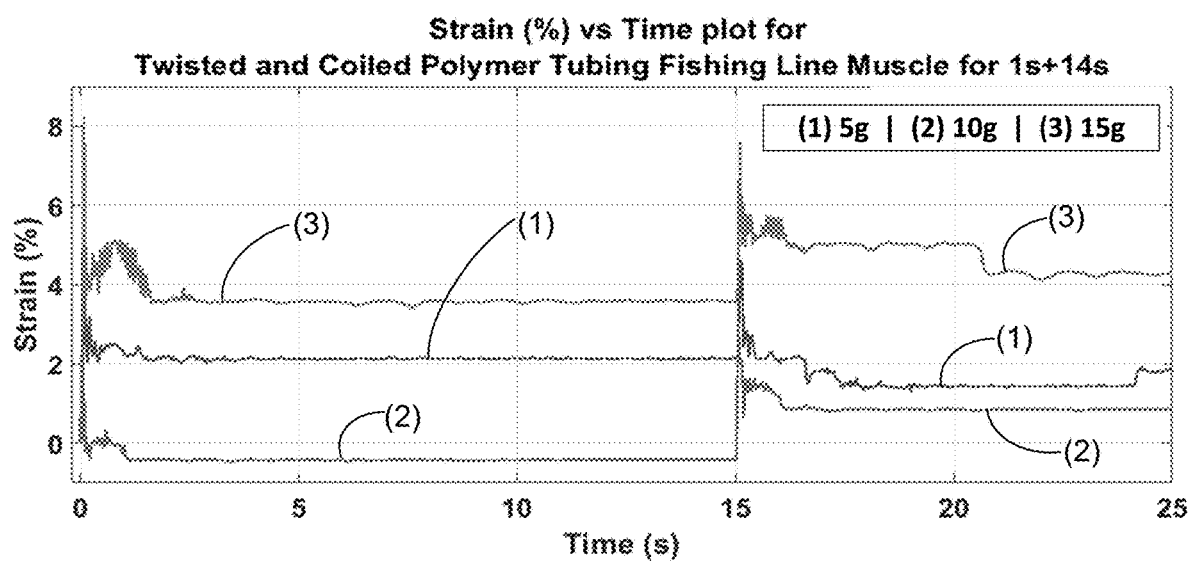
Figure 5J:
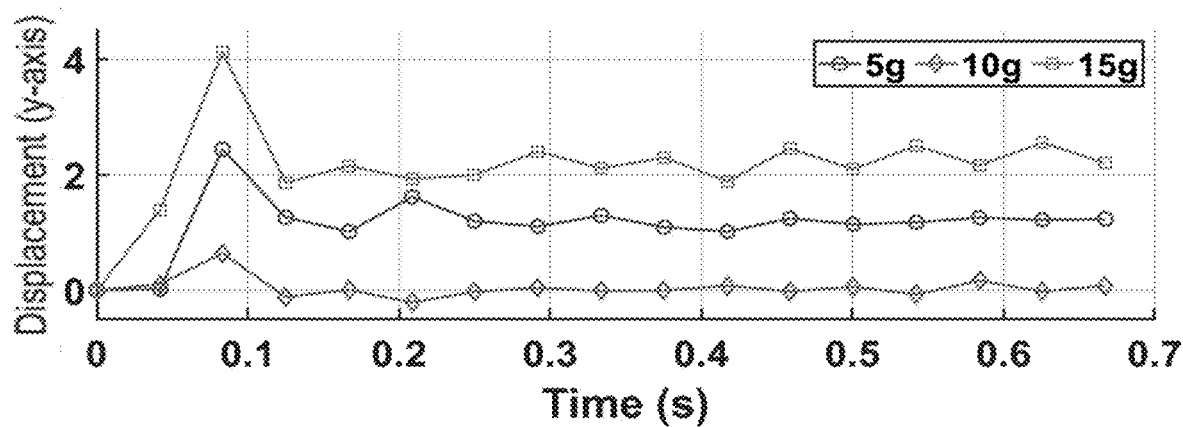
Figure 5K:
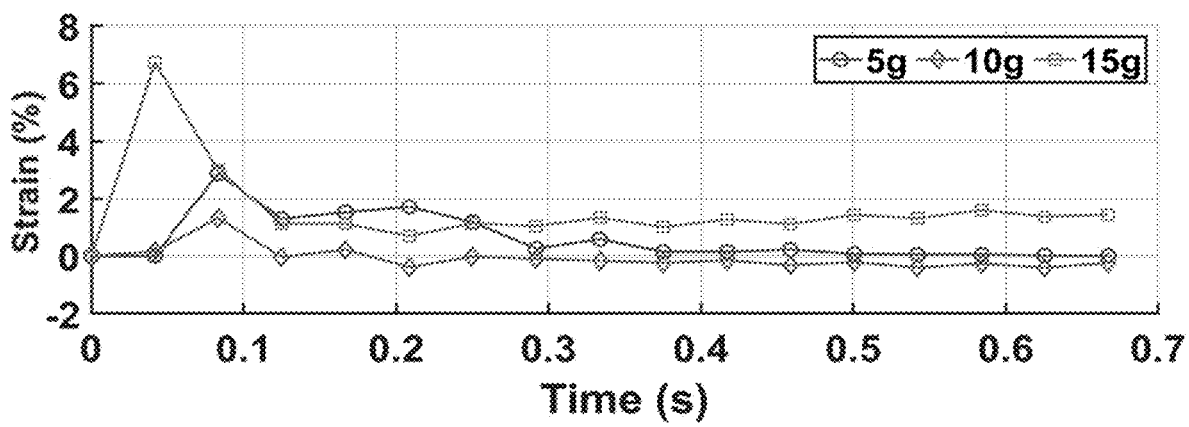

Turning now to FIGS. 5H-5K, these figures provide graphs showing performance at varying loads. FIG. 5H provides a graph showing displacement (in mm) along the y-axis (e.g., vertically) vs. time exhibited by the cannula TCP actuator for an actuation frequency of 0.067 Hz (1 s heating, 14 s cooling). Likewise, FIG. 5I provides a graph showing strain (% of the unloaded length) vs. time exhibited by the cannula TCP actuator for an actuation frequency of 0.067 Hz (1 s heating, 14 s cooling). The graphs include three sets of curves for varying load, (1) 5 g, (2) 10 g, and (3) 15 g. FIGS. 5J and 5K provide graphs which are zoomed versions of the graphs in FIGS. 5H and 5I, showing an expanded timeline for a portion of the first heating cycle in the graphs of FIGS. 5H and 5I, respectively.

The graphs in FIGS. 5B-5K show high performance of the cannula TCP actuator for relatively high frequency, low power/low load applications. The cannula TCP actuator exhibits fast actuation for low load (15 g or less) applications. For example, the graphs show actuation strain exceeding 1% and displacement exceeding 0.5 mm even at 1 Hz, which is a very high actuation frequency for an electrothermal actuator. As another example, the graphs show an actuation strain of up to 4% for a heating time of 1 s. As another example, the graphs show low power requirements for actuation, e.g., average power/cm of 7.2 mW for 5 centimeter (cm) movement, which is 1.44 mW per cm.

While a cannula TCP actuator of particular dimensions (e.g., diameter and length of the polymer microtube, diameter and length of the resistive heating wire) was the subject of the example characterizations represented in FIGS. 5B-5K, other dimensions can be used to fabricate a cannula TCP actuator as described herein. For example, a larger diameter polymer microtube can be used to increase the load carrying capacity of (or the actuation strain by) the cannula TCP actuator, but that will also increase the amount of input power needed to actuate the cannula TCP actuator. Also, larger diameter polymer microtubes can handle higher power input (which produces more heating). As another example, a relatively larger diameter resistance heating wire can be used for a larger diameter polymer microtube, which will increase the heat transfer efficiency (as the surface area in contact will increase), but the amount of power required will also increase.

An efficiency for the cannula TCP actuator can be evaluated according to the following formula:

$$\begin{aligned} \text{Actuator Efficiency} &= \frac{EnergyOut}{EnergyIn} \times 100\% \qquad (1)\\ &= \frac{\text{force} \times \text{displacement (mm)}}{\text{voltage (V)} \times \text{current }(A) \times \text{heat time (ms)}} \times 100\% \qquad (2) \end{aligned}$$

For an example cannula TCP actuator (e.g., an example cannula TCP actuator as used in obtaining the graphs in FIGS. 5B-5K), the efficiency is approximately 2%, which is significantly higher than previous electrothermal actuators.

Figure 6B:
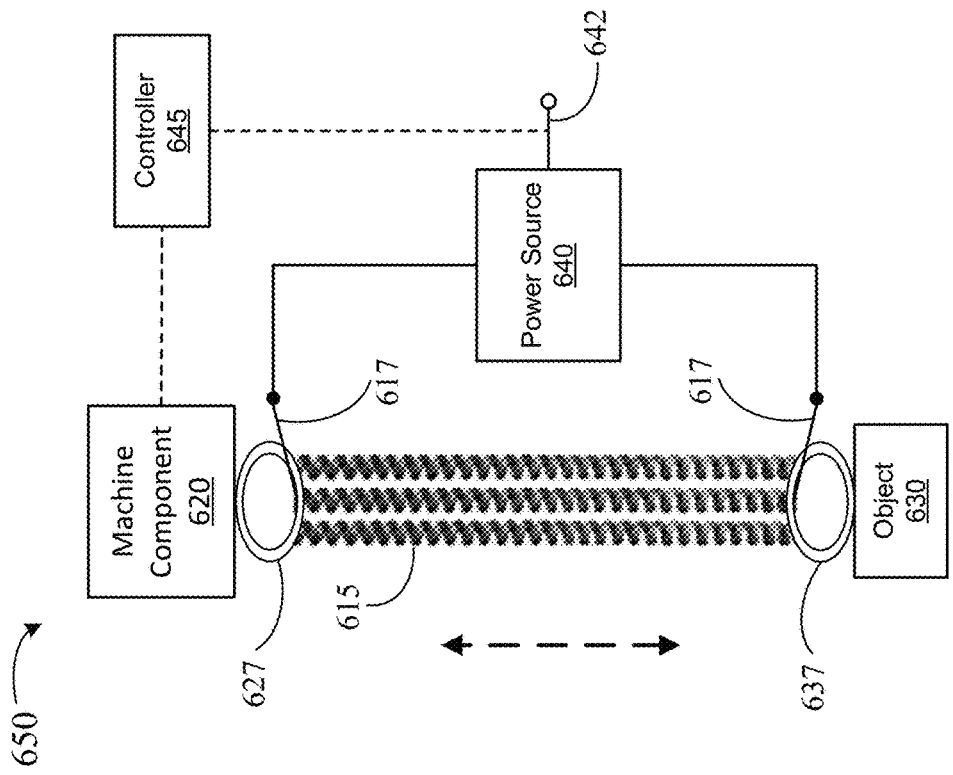
FIGS. 6A-6B provide diagrams illustrating examples of operating configurations for machines using a cannula TCP actuator according to one or more embodiments.
Figure 6A:
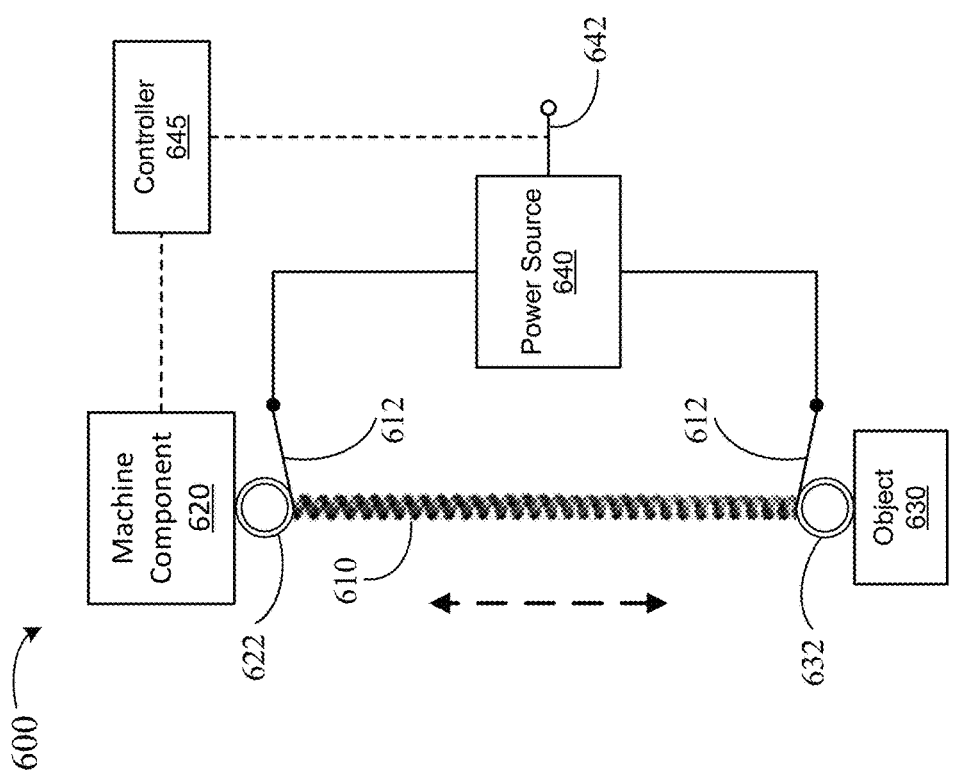

FIGS. 6A-6B provide diagrams illustrating examples of operating configurations for a machine using a cannula TCP actuator according to one or more embodiments, with reference to components and features described herein including but not limited to the figures and associated description. Turning to FIG. 6A, an operating configuration for a machine 600 includes a cannula TCP actuator 610, a machine component 620, an object 630, and a switchable power source 640. One end of the cannula TCP actuator 610 is attached to the machine component 620 via an attachment device 622, and the other end of the cannula TCP actuator 610 is attached to the object 630 via an attachment device 632. The machine component 620 can be a fixed or moveable component of the machine 600 and provides an attachment point for one end of the cannula TCP actuator 610.

The power source 640 provides an electrical power (e.g., observed as a voltage or current) that is switchable via a switch input 642 (e.g., a switch or a logic input signal that turns power on or off). The power source 640 is electrically coupled to each end 612 of the resistive heating wire in the cannula TCP actuator 610, such that an electrical power can be switchably applied to and withdrawn from the cannula TCP actuator 610. For example, the power source 640 can be connected to electrical connectors attached to the resistive heating wire in the cannula TCP actuator 610. When the power source 640 is switched on (e.g., via a logic signal), the electrical power is applied to the cannula TCP actuator 610, causing heating and thus actuation (e.g., contraction) of the cannula TCP actuator 610. When the power source 640 is switched off (e.g., via a logic signal), the electrical power is withdrawn from the cannula TCP actuator 610, causing cooling and thus relaxation (e.g., lengthening under load) of the cannula TCP actuator 610.

In operation, the power source 640 is turned on and off (e.g., at a desired frequency) via the switch input 642. This causes successive activation (heating) and cooling to control movement of the cannula TCP actuator 610, which in turn causes a desired force (e.g., motion) to be applied to the object 630. In some embodiments, a logic signal for controlling operation of the power source 640 via the switch input 642 is provided by a controller 645. In some embodiments, the controller 645 is coupled to (or integrated within) the machine 600.

In some embodiments, the controller 645 is implemented in one or more modules as a set of logic instructions stored in at least one non-transitory machine- or computer-readable storage medium such as random access memory (RAM), read only memory (ROM), programmable ROM (PROM), firmware, flash memory, etc., or in hardware such as configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

In embodiments, for operational use of the TCP actuator 610 (e.g., in a machine), an actuation frequency on the order of 0.1 Hz to 1 Hz can be used. For example, for 1 Hz actuation frequency a duty cycle of 50% provides for 0.5 s on and 0.5 s off. As another example, for a 0.5 Hz actuation frequency a duty cycle of 25% provides for 0.5 s on and 1.5 s off. The duty cycle can be varied, e.g. based on actuation frequency, and impacts the power consumption (and efficiency). In embodiments, for operational use of the TCP actuator 610 (e.g., in a machine), an actuation frequency greater than 1 Hz (e.g., up to 2-3 Hz) can be used with a lower duty cycle (e.g., 10% or less). In embodiments, a single (e.g., one-time) pulse can be applied to the TCP actuator 610 for actuation times ranging from 1 ms to 1 s for optimal actuation.

In embodiments the cannula TCP actuator 610 corresponds to the cannula TCP actuator 280 (FIG. 2E), the cannula TCP actuator 410 (FIG. 4), and/or the cannula TCP actuator 510 (FIG. 5A), and in some embodiments is trained according to a training process (e.g., as described herein). In embodiments the attachment device 622 corresponds to the attachment device 522, and the attachment device 632 corresponds to the attachment device 532. In embodiments, the attachment device 622 and/or the attachment device 632 are integrated into the cannula TCP actuator 610.

Turning now to FIG. 6B, an operating configuration for a machine 650 is shown, which includes components and features the same as or similar to those in the operating configuration for the machine 600 (FIG. 6A, already discussed), and those components and features will not be repeated except as appropriate to describe the components and features of the operating configuration for the machine 650. The operating configuration for the machine 650 includes a cannula TCP actuator group 615, a machine component 620, an object 630, and a switchable power source 640 having a switch input 642. The cannula TCP actuator group 615 is a combination of a plurality of cannula TCP actuators 610 arranged and connected in parallel. While three such cannula TCP actuators 610 are shown in FIG. 6B as connected to form the cannula TCP actuator group 615, a different number of cannula TCP actuators 610 can be connected in parallel to form the cannula TCP actuator group 615.

One end of the cannula TCP actuator group 615 is attached to the machine component 620 via an attachment device 627, and the other end of the cannula TCP actuator group 615 is attached to the object 630 via an attachment device 637. The attachment device 627 can be similar to the attachment device 622, and the attachment device 637 can be similar to the attachment device 632. The power source 640 is electrically coupled to each end 617 of the resistive heating wires in the cannula TCP actuator group 615, such that an electrical power (e.g., observed as a voltage or current) can be switchably applied to and withdrawn from the cannula TCP actuator group 615. For example, the power source 640 can be connected to electrical connectors attached to the resistive heating wires in the cannula TCP actuator group 615.

The machine 650 is operated in the same manner as the machine 600 (as discussed herein with reference to FIG. 6A). In some embodiments, a logic signal for controlling operation of the power source 640 via the switch input 642 is provided by a controller 645.

The cannula TCP actuator as described herein can be used in any number of applications such as, for example, micro/mini actuators, soft actuation systems, smart materials/actuators, soft robotics, actuators for prosthetics/orthotics, humanoid or socially assistive robots for hand/leg/head movements, underwater soft robots, soft morphing skin/structures, mini valves, fast actuating sensors, artificial muscles, etc.

Figure 7A:
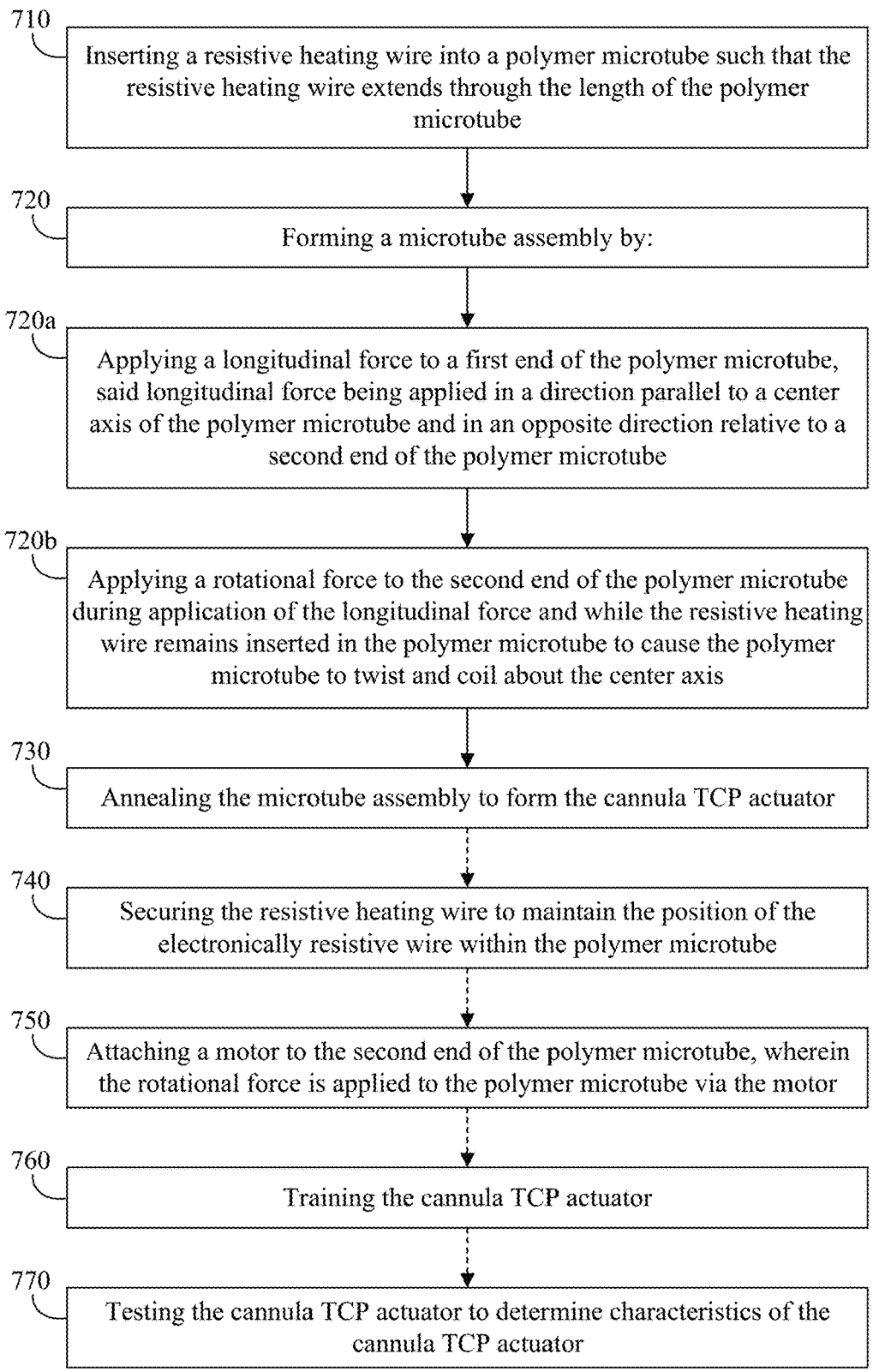
FIG. 7A provides a flow diagram illustrating an example method of fabricating a cannula TCP actuator according to one or more embodiments.

FIG. 7A provides a flow diagram illustrating an example method 700 of fabricating a cannula TCP actuator according to one or more embodiments, with reference to components and features described herein including but not limited to the figures and associated description. The cannula TCP actuator corresponds to the cannula TCP actuator 280 (FIG. 2E), the cannula TCP actuator 410 (FIG. 4), the cannula TCP actuator 510 (FIG. 5A), and/or the cannula TCP actuator 610 (FIG. 6A). The method 700 begins at block 710, which provides for inserting a resistive heating wire into a polymer microtube such that the resistive heating wire extends through the length of the polymer microtube. In some embodiments, the polymer microtube is made of polyethylene and/or nylon. In some embodiments, the resistive heating wire is a nichrome wire.

Block 720 provides for forming a microtube assembly by, at block 720*a*, applying a longitudinal force to a first end of the polymer microtube, said longitudinal force being applied in a direction parallel to a center axis of the polymer microtube and in an opposite direction relative to a second end of the polymer microtube, and, at block 720*b*, applying a rotational force to the second end of the polymer microtube during application of the longitudinal force and while the resistive heating wire remains inserted in the polymer microtube to cause the polymer microtube to twist and coil about the center axis. In some embodiments, the longitudinal force is applied via attaching a weight to a first end of the polymer microtube. In some embodiments, the rotational force is applied to the second end of the polymer microtube while the first end of the polymer microtube is kept from rotating.

Block 730 provides for annealing the microtube assembly to form the cannula TCP actuator. In embodiments, annealing the microtube assembly includes placing the microtube assembly in proximity to a heat source, where heat from the heat source is applied to the microtube assembly over a period of time. In some embodiments, the microtube assembly is placed horizontally on a supporting surface underneath or otherwise near to the heat source. In some embodiments, the heat source is integrated within an enclosed or a partially enclosed unit such as, e.g., an oven or a furnace.

In some embodiments, block 740 provides for securing the resistive heating wire to maintain the position of the electronically resistive wire within the polymer microtube. For example, in some embodiments the resistive wire is secured by crimping or tying the ends of the polymer microtube.

In some embodiments, block 750 provides for attaching a motor to the second end of the polymer microtube, where the rotational force is applied to the polymer microtube via the motor. In some embodiments, the motor is operated for a fixed time at a number of revolutions per minute. In some embodiments, the motor causes the rotational force to be applied to the polymer microtube in a counterclockwise direction.

In some embodiments, block 760 provides for training the cannula TCP actuator. In some embodiments, block 770 provides for testing the cannula TCP actuator to determine characteristics of the cannula TCP actuator.

Figure 7B:
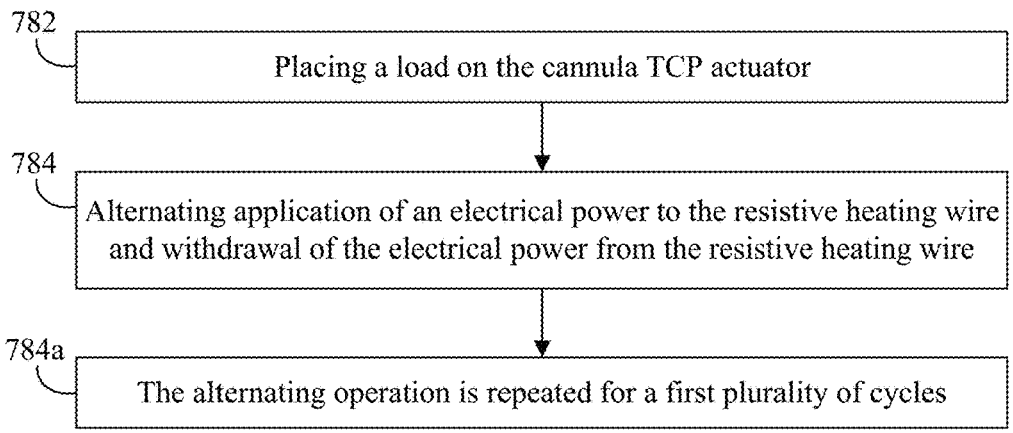
FIG. 7B provides a flow diagram illustrating an example method of training a cannula TCP actuator according to one or more embodiments.

FIG. 7B provides a flow diagram illustrating an example method 780 of training a cannula TCP actuator according to one or more embodiments, with reference to components and features described herein including but not limited to the figures and associated description. The method 780 can generally be substituted for block 760 in FIG. 7A. The method 780 begins at block 782, which provides for placing a load on the cannula TCP actuator. Block 784 provides for alternating application of an electrical power to the resistive heating wire and withdrawal of the electrical power from the resistive heating wire, where at block 784*a* the alternating operation is repeated for a first plurality of cycles.

In some embodiments, the method 780 further includes modifying the electrical power and repeating the alternating operation using the modified electrical power for a second plurality of cycles. In some embodiments, a multi-phase training process is applied (such as, e.g., 3 phases), where each phase includes the application then withdrawal of the electrical power that is repeated for several cycles, and the amount of power is varied from phase-to-phase. In some embodiments, the alternating operation is performed for a first number of cycles using a first amount of electrical power applied for a first heating time period and withdrawn for a first cooling time period, then a second number of cycles using a second amount of electrical power applied for a second heating time period and withdrawn for a second cooling time period, and then a third number of cycles using a third amount of electrical power applied for a third heating time period and withdrawn for a third cooling time period.

Figure 7C:
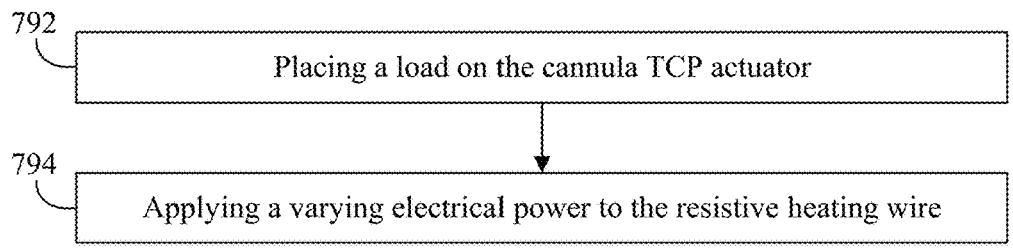
FIG. 7C provides a flow diagram illustrating an example method of testing a cannula TCP actuator for characterization according to one or more embodiments.

FIG. 7C provides a flow diagram illustrating an example method 790 of testing a cannula TCP actuator to determine characteristics of the cannula TCP actuator according to one or more embodiments, with reference to components and features described herein including but not limited to the figures and associated description. The method 790 can generally be substituted for block 770 in FIG. 7A. The method 790 begins at block 792, which provides for placing a load on the cannula TCP actuator. Block 794 provides for applying a varying electrical power to the resistive heating wire, where the characteristics of the cannula TCP actuator include one or more of performance of the cannula TCP actuator at different actuation frequencies or performance of the cannula TCP actuator at different load levels.

Figure 8:
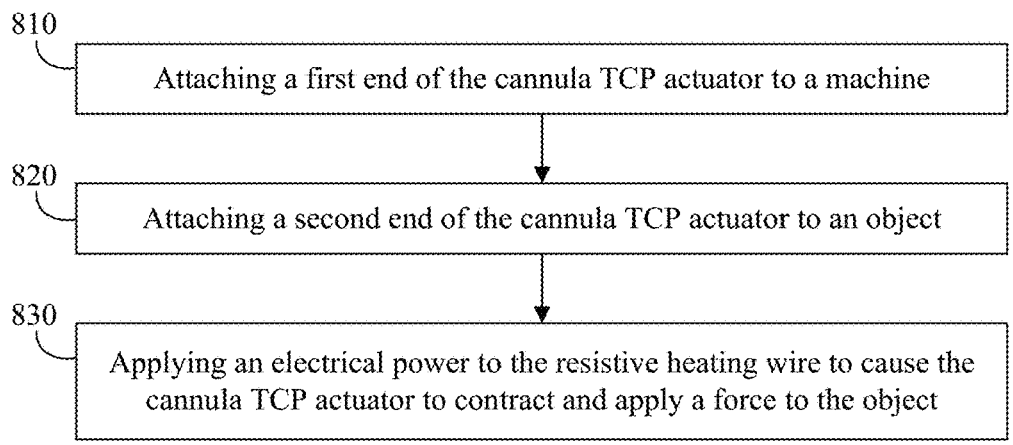
FIG. 8 provides a flow diagram illustrating an example method of operating a machine including a cannula TCP actuator according to one or more embodiments.

FIG. 8 provides a flow diagram illustrating an example method 800 of operating a machine including a cannula TCP actuator according to one or more embodiments, with reference to components and features described herein including but not limited to the figures and associated description. The cannula TCP actuator corresponds to the cannula TCP actuator 280 (FIG. 2E), the cannula TCP actuator 410 (FIG. 4), the cannula TCP actuator 510 (FIG. 5A), and/or the cannula TCP actuator 610 (FIG. 6A). The method 800 begins at block 810, which provides for attaching a first end of a cannula TCP actuator to a machine. Block 820 provides for attaching a second end of the cannula TCP actuator to an object. Block 830 provides for applying an electrical power to a resistive heating wire in the cannula TCP actuator to cause the cannula TCP actuator to contract and apply a force to the object.

The cannula TCP actuator used in the method 800 includes a microtube assembly comprising a polymer microtube having inserted therein a resistive heating wire such that the resistive heating wire extends through the length of the polymer microtube, where the microtube assembly is arranged in a twisted and coiled tube formed by application of a longitudinal force to a first end of the polymer microtube, said longitudinal force being applied in a direction parallel to a center axis of the polymer microtube and in an opposite direction relative to a second end of the polymer microtube, and application of a rotational force to the second end of the polymer microtube during the application of the longitudinal force and while the resistive heating wire remains inserted in the polymer microtube to cause the polymer microtube to twist and coil about the center axis, and where the microtube assembly is further annealed to provide the cannula TCP actuator.

In some embodiments, a plurality of cannula TCP actuators are attached in parallel to the machine and to the object, where the electrical power is applied to each resistive heating wire in the plurality of cannula TCP actuators. In some embodiments, the electrical power is applied with a frequency in the range of 0.1 to 1.0 Hz. In some embodiments, the electrical power is applied under the control of a controller.

ADDITIONAL NOTES AND EXAMPLES

Example $M_A1$ includes a method of fabricating a cannula TCP actuator, comprising inserting a resistive heating wire into a polymer microtube such that the resistive heating wire extends through the length of the polymer microtube, forming a microtube assembly by applying a longitudinal force to a first end of the polymer microtube, said longitudinal force being applied in a direction parallel to a center axis of the polymer microtube and in an opposite direction relative to a second end of the polymer microtube, and applying a rotational force to the second end of the polymer microtube during application of the longitudinal force and while the resistive heating wire remains inserted in the polymer microtube to cause the polymer microtube to twist and coil about the center axis, and annealing the microtube assembly to form the cannula TCP actuator.

Example $M_A2$ includes the method of Example $M_A1$, further comprising securing the resistive heating wire to maintain the position of the electronically resistive wire within the polymer microtube.

Example $M_A3$ includes the method of Example $M_A1$ or $M_A2$, wherein applying a rotational force to the second end of the polymer microtube occurs while the first end of the polymer microtube is kept from rotating.

Example $M_A4$ includes the method of any of Examples $M_A1$-$M_A3$, further comprising attaching a motor to the second end of the polymer microtube, wherein the rotational force is applied to the polymer microtube via the motor.

Example $M_A5$ includes the method of any of Examples $M_A1$-$M_A4$, wherein the motor causes the rotational force to be applied to the polymer microtube in a counterclockwise direction.

Example $M_A6$ includes the method of any of Examples $M_A1$-$M_A5$, wherein the longitudinal force is applied by attaching a weight to the first end of the polymer microtube.

Example $M_A7$ includes the method of any of Examples $M_A1$-$M_A6$, wherein the weight is secured such that the weight does not rotate when the rotational force is applied.

Example $M_A8$ includes the method of any of Examples $M_A1$-$M_A7$, further comprising training the cannula TCP actuator.

Example $M_A9$ includes the method of any of Examples $M_A1$-$M_A8$, wherein training the cannula TCP actuator comprises placing a load on the cannula TCP actuator, and alternating application of an electrical power to the resistive heating wire and withdrawal of the electrical power from the resistive heating wire, wherein the alternating operation is repeated for a first plurality of cycles.

Example $M_A10$ includes the method of any of Examples $M_A1$-$M_A9$, further comprising modifying the electrical power and repeating the alternating operation using the modified electrical power for a second plurality of cycles.

Example $M_A11$ includes the method of any of Examples $M_A1$-$M_A10$, further comprising testing the cannula TCP actuator to determine characteristics of the cannula TCP actuator.

Example $M_A12$ includes the method of any of Examples $M_A1$-$M_A11$, wherein testing the cannula TCP actuator comprises placing a load on the cannula TCP actuator, and applying a varying electrical power to the resistive heating wire.

Example $M_A13$ includes the method of any of Examples $M_A1$-$M_A12$, wherein the characteristics of the cannula TCP actuator include one or more of performance of the cannula TCP actuator at different actuation frequencies or performance of the cannula TCP actuator at different load levels.

Example $M_A14$ includes the method of any of Examples $M_A1$-$M_A13$, wherein the resistive heating wire comprises nichrome wire.

Example $M_A15$ includes the method of any of Examples $M_A1$-$M_A14$, wherein the polymer microtube comprises one of polyethylene or nylon.

Example A1 includes a cannula TCP actuator, comprising an annealed microtube assembly comprising a polymer microtube having inserted therein a resistive heating wire such that the resistive heating wire extends through the length of the polymer microtube, wherein the microtube assembly is arranged in a twisted and coiled tube.

Example A2 includes the cannula TCP actuator of Example A1, wherein the resistive heating wire is secured to maintain the position of the electronically resistive wire within the polymer microtube.

Example A3 includes the cannula TCP actuator of Example A1 or A2, wherein the polymer microtube is crimped at each end to secure the resistive heating wire.

Example A4 includes the cannula TCP actuator of any of Examples A1-A3, wherein the cannula TCP actuator is trained via a training operation.

Example A5 includes the cannula TCP actuator of any of Examples A1-A4, wherein the resistive heating wire comprises nichrome wire.

Example A6 includes the cannula TCP actuator of any of Examples A1-A5, wherein the polymer microtube comprises one of polyethylene or nylon.

Example $M_B1$ includes a method of operating a machine including a cannula TCP actuator, comprising attaching a first end of a cannula TCP actuator to a machine, attaching a second end of the cannula TCP actuator to an object, applying an electrical power to a resistive heating wire in the cannula TCP actuator to cause the cannula TCP actuator to contract and apply a force to the object, wherein the cannula TCP actuator includes an annealed microtube assembly comprising a polymer microtube having inserted therein the resistive heating wire such that the resistive heating wire extends through the length of the polymer microtube, wherein the microtube assembly is arranged in a twisted and coiled tube.

Example $M_B2$ includes the method of Example $M_B1$, wherein a plurality of cannula TCP actuators are attached in parallel to the machine and to the object, and wherein the electrical power is applied to each resistive heating wire in the plurality of cannula TCP actuators.

Example $M_B3$ includes the method of Example $M_B1$ or $M_B2$, wherein the electrical power is applied with a frequency in the range of 0.1 to 1.0 Hz.

Example AM1 includes an apparatus comprising means for performing the method of any of Examples $M_A1$ to $M_A15$.

Example T1 includes a cannula TCP actuator fabricated according to the method of any of Examples $M_A1$ to $M_A15$.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), solid state drive (SSD)/NAND drive controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of fabricating a cannula TCP actuator, comprising:
    inserting a resistive heating wire into a polymer microtube such that the resistive heating wire extends through the length of the polymer microtube;
    forming a microtube assembly by:
        applying a longitudinal force to a first end of the polymer microtube, said longitudinal force being applied in a direction parallel to a center axis of the polymer microtube and in an opposite direction relative to a second end of the polymer microtube; and
        applying a rotational force to the second end of the polymer microtube during application of the longitudinal force and while the resistive heating wire remains inserted in the polymer microtube to cause the polymer microtube to twist and coil about the center axis; and
    annealing the microtube assembly to form the cannula TCP actuator.

2. The method of claim 1, further comprising securing the resistive heating wire to maintain the position of the electronically resistive wire within the polymer microtube.

3. The method of claim 1, wherein applying a rotational force to the second end of the polymer microtube occurs while the first end of the polymer microtube is kept from rotating.

4. The method of claim 3, further comprising attaching a motor to the second end of the polymer microtube, wherein the rotational force is applied to the polymer microtube via the motor.

5. The method of claim 4, wherein the motor causes the rotational force to be applied to the polymer microtube in a counterclockwise direction.

6. The method of claim 4, wherein the longitudinal force is applied by attaching a weight to the first end of the polymer microtube.

7. The method of claim 6, wherein the weight is secured such that the weight does not rotate when the rotational force is applied.

8. The method of claim 3, further comprising training the cannula TCP actuator.

9. The method of claim 8, wherein training the cannula TCP actuator comprises:
    placing a load on the cannula TCP actuator; and
    alternating application of an electrical power to the resistive heating wire and withdrawal of the electrical power from the resistive heating wire, wherein the alternating operation is repeated for a first plurality of cycles.

10. The method of claim 9, further comprising modifying the electrical power and repeating the alternating operation using the modified electrical power for a second plurality of cycles.

11. The method of claim 8, further comprising testing the cannula TCP actuator to determine characteristics of the cannula TCP actuator.

12. The method of claim 11, wherein testing the cannula TCP actuator comprises:
    placing a load on the cannula TCP actuator; and
    applying a varying electrical power to the resistive heating wire.

13. The method of claim 12, wherein the characteristics of the cannula TCP actuator include one or more of performance of the cannula TCP actuator at different actuation frequencies or performance of the cannula TCP actuator at different load levels.

14. The method of claim 3, wherein the resistive heating wire comprises nichrome wire and wherein the polymer microtube comprises one of polyethylene or nylon.

15. A cannula TCP actuator, comprising an annealed microtube assembly comprising a polymer microtube having inserted therein a resistive heating wire such that the resistive heating wire extends through the length of the polymer microtube, wherein the microtube assembly is arranged in a twisted and coiled tube, and wherein the resistive heating wire is secured to maintain the position of the electronically resistive wire within the polymer microtube.

16. The cannula TCP actuator of claim 15, wherein the polymer microtube is crimped at each end to secure the resistive heating wire.

17. The cannula TCP actuator of claim 15, wherein the resistive heating wire comprises nichrome wire and wherein the polymer microtube comprises one of polyethylene or nylon.

18. A method of operating a machine including a cannula TCP actuator, comprising:
   attaching a first end of a cannula TCP actuator to a machine;
   attaching a second end of the cannula TCP actuator to an object;
   applying an electrical power to a resistive heating wire in the cannula TCP actuator to cause the cannula TCP actuator to contract and apply a force to the object;
   wherein the cannula TCP actuator includes an annealed microtube assembly comprising a polymer microtube having inserted therein the resistive heating wire such that the resistive heating wire extends through the length of the polymer microtube, wherein the microtube assembly is arranged in a twisted and coiled tube.

19. The method of claim 18, wherein a plurality of cannula TCP actuators are attached in parallel to the machine and to the object, and wherein the electrical power is applied to each resistive heating wire in the plurality of cannula TCP actuators.

20. The method of claim 19, wherein the electrical power is applied with a frequency in the range of 0.1 to 1.0 Hz.

* * * * *